(12) United States Patent
Doremus et al.

(10) Patent No.: US 6,779,643 B2
(45) Date of Patent: Aug. 24, 2004

(54) FRICTION CLUTCH WITH CONTROLLED PLAY COMPENSATION FOR MOTOR VEHICLE

(75) Inventors: Olivier Doremus, Izel-lez-Hameau (FR); Gilles Payraudeau, Saint-Vast-en-Chaussee (FR); Hervé Maurel, Paris (FR); Jean-Louis Delevallee, Salquel (FR); Ciriaco Bonfilio, Clichy (FR); Mathieu Leclercq, Amiens (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 10/275,810

(22) PCT Filed: May 21, 2001

(86) PCT No.: PCT/FR01/01561
§ 371 (c)(1),
(2), (4) Date: Nov. 12, 2002

(87) PCT Pub. No.: WO01/88400
PCT Pub. Date: Nov. 22, 2001

(65) Prior Publication Data
US 2003/0141163 A1 Jul. 31, 2003

(51) Int. Cl.[7] ............................................. F16D 13/75
(52) U.S. Cl. ................................. 192/70.25; 192/111 A
(58) Field of Search ........................... 192/70.25, 111 A

(56) References Cited
U.S. PATENT DOCUMENTS

| | | | |
|---|---|---|---|
| 5,069,322 A | 12/1991 | Mizukami et al. | |
| 5,090,536 A | 2/1992 | Asada | |
| 5,469,760 A | 11/1995 | Kamio | |
| 5,560,463 A * | 10/1996 | Link et al. | 192/70.25 |
| 5,641,048 A | 6/1997 | von Gaisberg | |
| 5,645,153 A * | 7/1997 | Weidinger | 192/70.25 |
| 5,645,154 A * | 7/1997 | Weidinger | 192/70.25 |
| 5,911,293 A * | 6/1999 | Weiss et al. | 192/70.25 |
| 6,021,877 A | 2/2000 | Weidinger et al. | |
| 6,029,787 A | 2/2000 | Reik et al. | |
| 6,227,341 B1 * | 5/2001 | Dalbiez et al. | 192/70.25 |
| 6,264,019 B1 * | 7/2001 | Uehara | 192/70.25 |

FOREIGN PATENT DOCUMENTS

| | | |
|---|---|---|
| FR | 2 750 467 | 1/1998 |
| GB | 2 278 894 | 12/1994 |

* cited by examiner

Primary Examiner—Rodney H. Bonck
(74) Attorney, Agent, or Firm—Liniak, Berenato & White

(57) ABSTRACT

A friction clutch comprising a pressure plate (12) consisting of tow half-plates (12A, 12B) integral in rotation with the input shaft but axially mobile, relative to each other, under the action of the device compensating play due to wear. The wear compensating device comprises a pair of complementary ramps (17, 18) circumferentially arranged, axially associated respectively with each of the half-plates (12A, 12B), one support ramp (17) being integral in rotation to one (12B) of the half-plates, the other adjustment ramp (18) being adapted to move circumferentially relative to the support ramp (17) in the compensating direction increasing the global thickness of the first plate (12) and prevented form moving in the other direction by one-way means (24). The circumferential movement is controlled by a tripping element (22) sensitive to wear condition, the adjusting ramp (18) being arranged at the periphery of an inertial piece (12A).

24 Claims, 18 Drawing Sheets

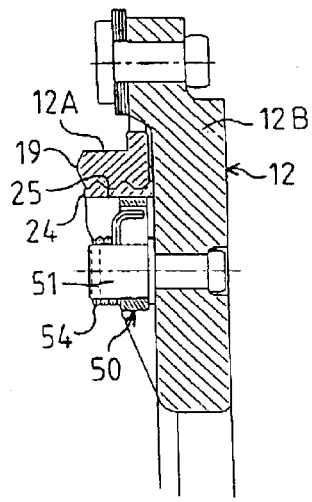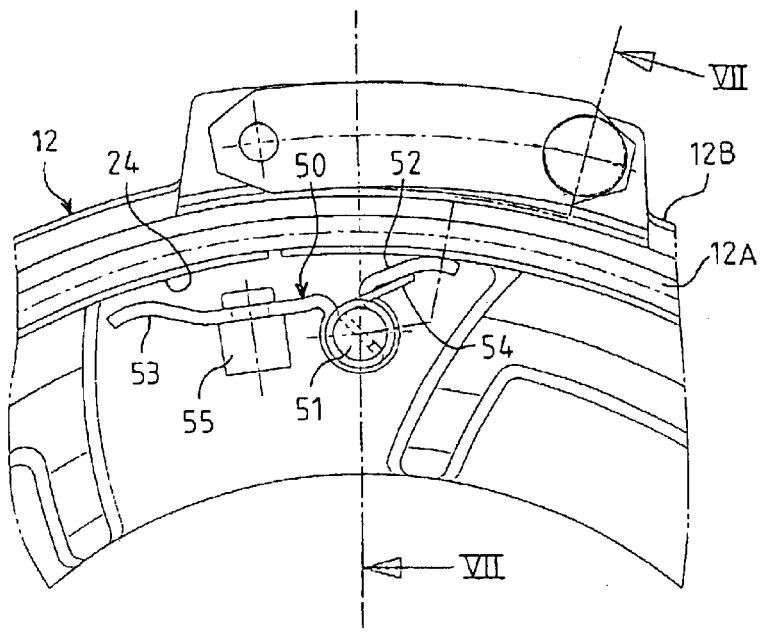
Fig. 7  Fig. 8
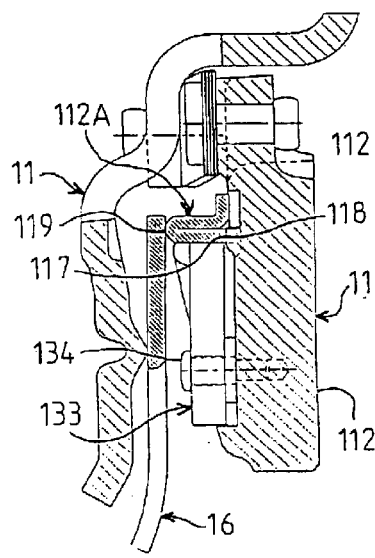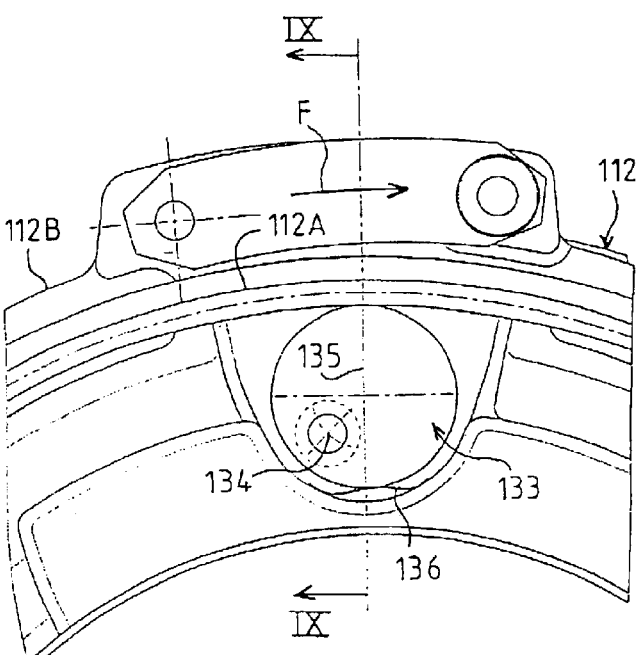
Fig. 9  Fig. 10

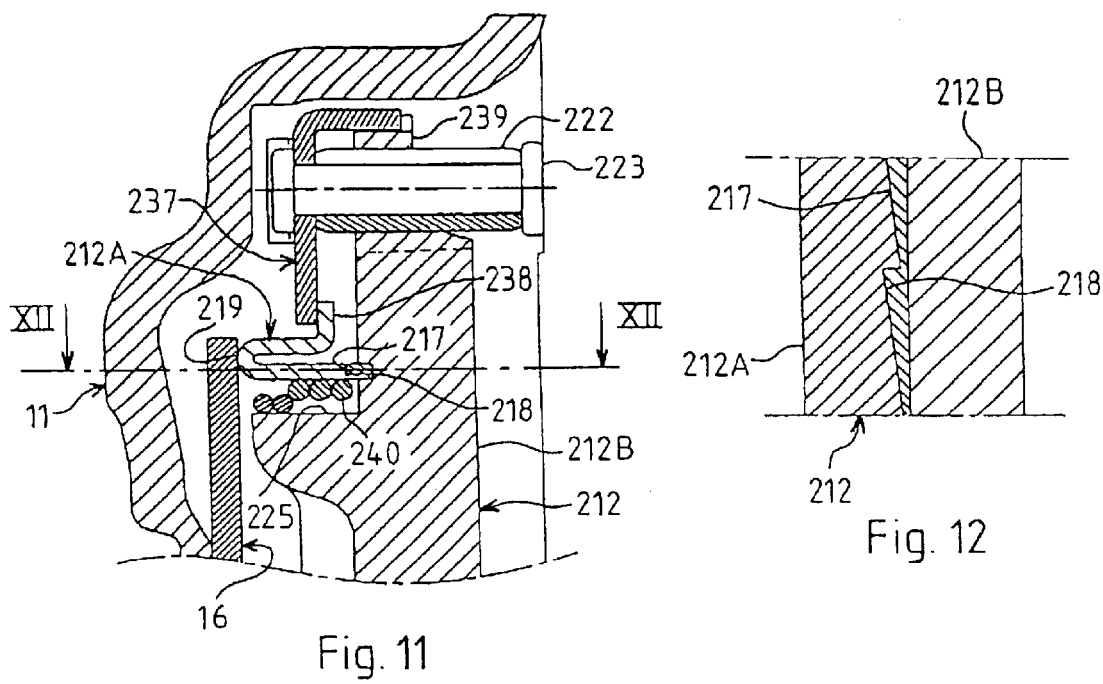
Fig. 11
Fig. 12
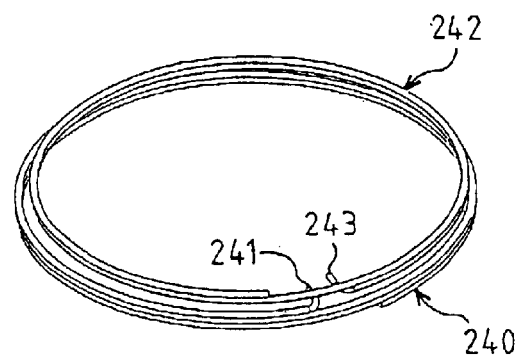
Fig. 13
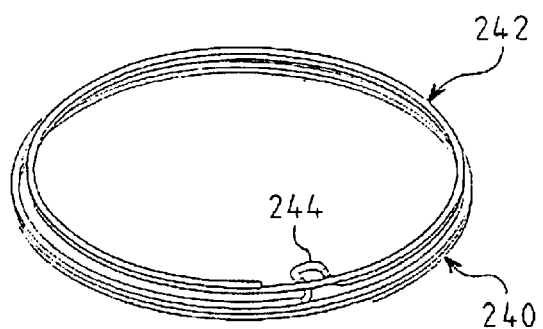
Fig. 14

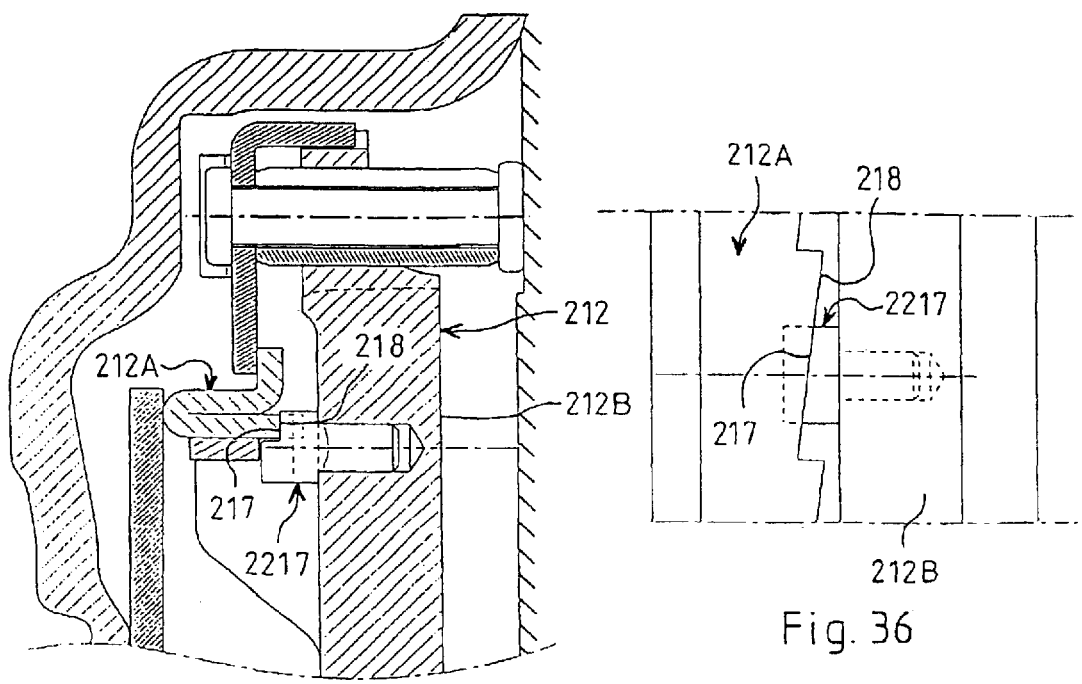
Fig. 35
Fig. 36
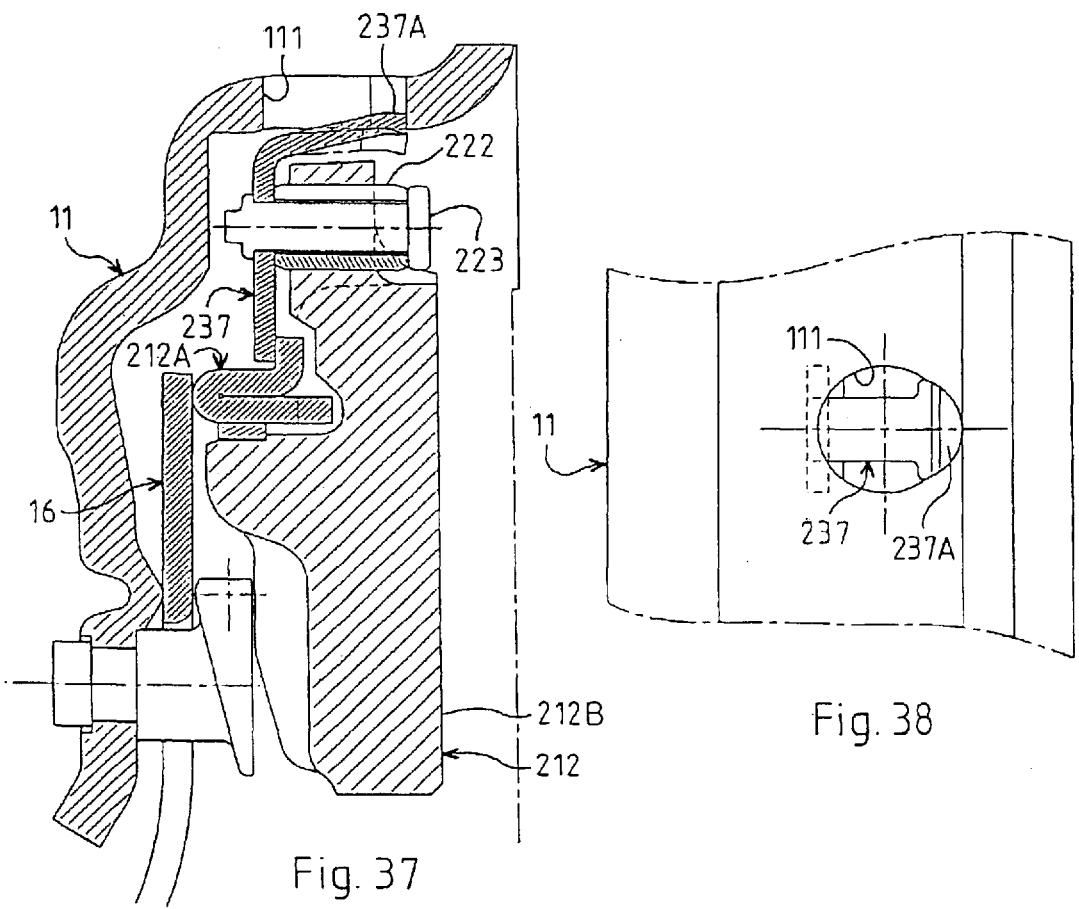
Fig. 37
Fig. 38

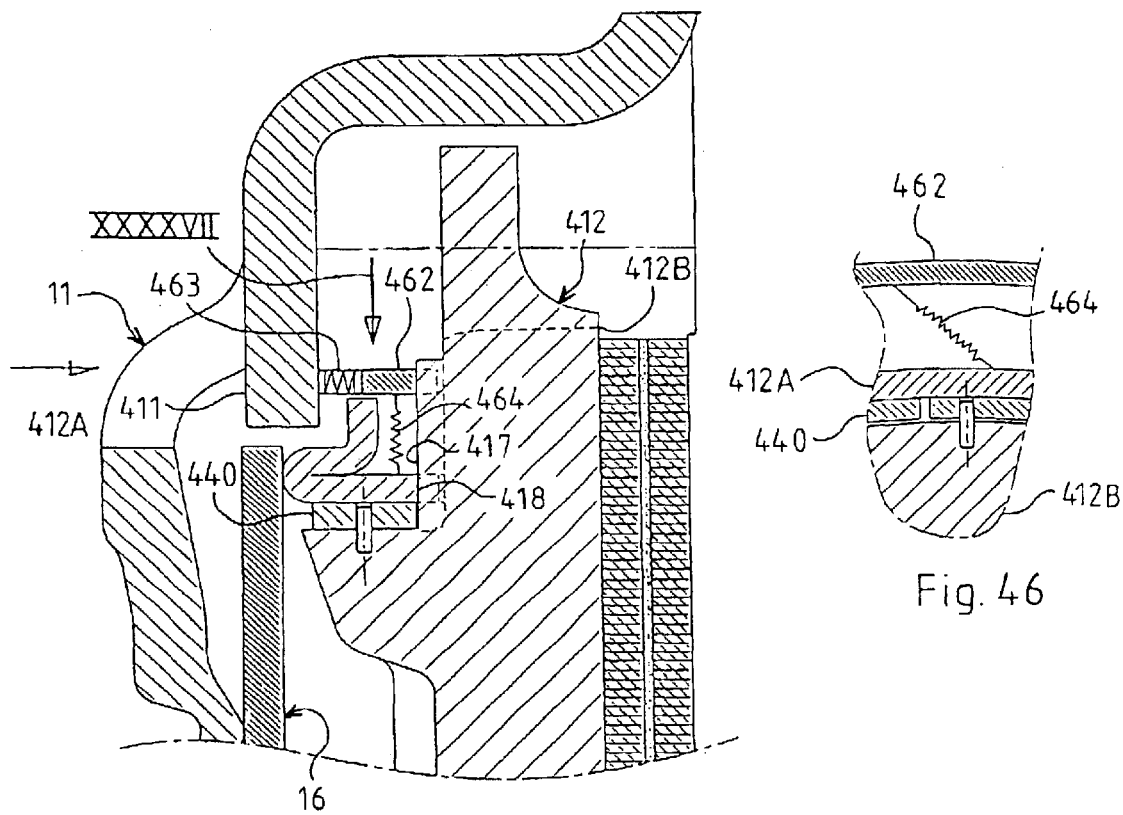
Fig. 45
Fig. 46
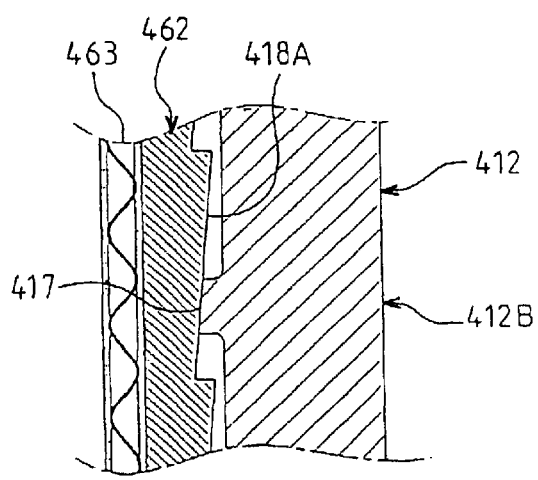
Fig. 47

FRICTION CLUTCH WITH CONTROLLED PLAY COMPENSATION FOR MOTOR VEHICLE

The present invention concerns a friction clutch for a thermal engine motor vehicle, and relates particularly to a clutch equipped with a device for taking up the play due mainly to the wear on the friction linings, the said device operating continuously as the wear occurs on the said linings.

A conventional friction clutch generally comprises a reaction plate, possibly in two parts in order to form a damping flywheel, fixed rotationally to a first shaft, usually a driving shaft such as the crankshaft of the internal combustion engine, and supporting through its external periphery a cover to which at least one pressure plate is attached.

The pressure plate is rotationally fixed to the cover and to the reaction plate whilst being able to move axially under the action of the controlled axially acting resilient means, generally a metallic diaphragm bearing on the cover, whilst a friction disc, carrying friction linings at its external periphery, rotationally fixed to a shaft, usually a driven shaft such as the input shaft of the gearbox, is interposed between the pressure plate and the reaction plate so as to be clamped between them when the clutch is in the engagement position. The diaphragm controls the axial movement of the pressure plate when it is actuated by a clutch release bearing.

During the service life of such a clutch, the friction linings and, to a lesser extent, the counter materials, pressure plate and reaction plate, wear, which causes a variation in the clamping force between the friction disc on the one hand and the pressure and reaction plates on the other hand, because of the changes in the working conditions of the diaphragm. The clutch travel also varies, as well as the force necessary for declutching. By providing such a clutch with a device for taking up the play due mainly to the wear on the linings, these drawbacks are avoided.

Through the document FR 2 426 834, a play take-up device is known in which a first plate, in this case the pressure plate, is in two coaxial parts able to be moved axially with respect to one another so that the overall thickness of the first plate increases as the wear increases.

In this document, the two coaxial parts of the first plate are able to be moved axially with respect to one another by virtue of a take-up device which comprises ramp means carried in a complementary fashion by the two coaxial parts, which are also able to be moved in rotation with respect to one another in the direction of the increase in the said overall thickness and prevented from turning with respect to one another in the opposite direction to the previous one by a unidirectional means. The relative rotation movement of the coaxial parts is controlled by a trigger device sensitive to the state of wear and implemented by a circumferentially acting resilient means coupled between the said two coaxial parts.

Such a device effectively continuously takes up the play due to the wear on the friction linings. There has also been proposed, in particular in the document FR-A-2 750 467, a clutch of the above type which is of more simple design, having a lesser number of parts.

According to this document, a friction clutch, in particular for a motor vehicle, of the type comprising a reaction plate intended to be rotationally fixed to a driving shaft, a friction disc, carrying friction linings at its external periphery, intended to be rotationally fixed to a driven shaft, a pressure plate, a cover fixed to the reaction plate, axially acting resilient means acting between the cover and the pressure plate, the pressure plate being rotationally fixed to the cover whilst being able to move axially with respect to it, one of the two plates, the reaction plate or the pressure plate, referred to as the first plate, consisting of two half-plates, a so-called external half-plate and a so-called internal half-plate, the internal half-plate being the one which faces a friction lining and which is intended to cooperate with it, the two half-plates being rotationally fixed to the driving shaft but able to be moved axially, with respect to each other, under the action of a device for taking up the play due to the wear mainly on the friction linings, which wear take-up device comprises at least one pair of circumferentially disposed complementary ramps associated respectively with each of the two half-plates, one of the ramps, referred to as the support ramp, being rotationally fixed to one of the half-plates, the other ramp, referred to as the adjustment ramp, being fixed to the other half-plate and adapted to move circumferentially with respect to the support ramp, in the direction of increase in the overall thickness of the said first plate, referred to as the take-up direction, and prevented from moving in the other direction by a so-called unidirectional means, the said circumferential movement being controlled by a release sensitive to the state of wear.

According to this document, the adjustment ramp is provided at the periphery of an inertia piece, so that the lack of periodicity of the thermal engine of the motor vehicle is taken advantage of in order to make the complementary ramps effect their relative circumferential movement in the direction of taking up of play. This is because, as is known, lack of periodicity in rotation results in alternating angular accelerations which may achieve more or less two thousand radians per second squared; by virtue of the inertia piece subjected to these angular accelerations, when the clutch is disengaged and consequently the two half-plates are no longer under the axial force of the axial acting resilient means, the adjustment ramp turns in the taking-up direction with respect to the support ramp, since the unidirectional means prevent it from turning in the other direction. Thus it is not necessary to provide a circumferentially acting resilient means between the two so-called coaxial parts and the lack of periodicity is taken advantage of.

As can also be seen, the functioning of the play take-up device is automatic. Experience has shown that cases may occur where this automatic functioning is a drawback since it leads to a take-up operation which is not related to the wear, an operation known as over-takeup.

This is the case for example at very low speed, below the tickover speed, and in particular when the reaction plate, or flywheel, is a double-damping flywheel where the natural frequency of the vibrations is situated in this range of low speeds and produces vibration causing the external half-plate to move and take up a "play" which does not exist.

Other parasitic phenomena may occur at higher speeds, for example above two thousand revolutions per minute.

The aim of the present invention is to avoid these drawbacks.

According to the invention, a friction clutch for a motor vehicle with a thermal engine, of the type having a reaction plate intended to be rotationally fixed to a driving shaft, a friction disc, carrying friction linings at its external periphery, intended to be rotationally fixed to a driven shaft, a pressure plate, a cover fixed to the reaction plate, axially acting resilient means acting between the cover and the pressure plate, the pressure plate being rotationally fixed to the cover whilst being able to move axially with respect to it, one of the pieces, the reaction plate or the pressure plate or cover, consisting of two half-pieces, able to be moved axially, with respect to one another, under the action of a device for taking up the play due to wear, which play take-up device comprises at least one pair of circumferentially disposed complementary ramps axially associated respectively with each of the two half-pieces, one of the ramps, being adapted to move circumferentially with respect to the other ramp in the direction of an increase in the overall thickness of the said piece, referred to as the take-up direction, and prevented from moving in the other direction by a so-called unidirectional means, the said circumferential movement being controlled by a release sensitive to the state of wear, one of the ramps being provided at the periphery of an inertia piece, so that the lack of periodicity of the thermal engine of the motor vehicle is taken advantage of in order to make the complementary ramps make their relative circumferential movement in the direction of taking up the play, is characterised by the fact that it comprises control means adapted to control the play take-up device by allowing its functioning or not.

Advantageously, the said piece is one of the two plates, the reaction plate or the pressure plate, referred to as the first plate, consisting of two half-plates, a so-called external half-plate and a so-called internal half-plate, the internal half-plate being the one which faces a friction lining and which is intended to cooperate with it, the two half-plates being rotationally fixed to the driving shaft but able to be moved axially, with respect to one another, under the action of the play take-up device, one of the ramps, known as the support ramp, being rotationally fixed to one of the half-plates, the other ramp, known as the adjustment ramp, being adapted to move circumferentially with respect to the support ramp in the direction of an increase in the overall thickness of the said first plate, the adjustment ramp being provided at the periphery of the inertia piece.

The support ramp is preferably carried by the internal half-plate.

Advantageously, the adjustment ramp is carried by the external half-plate.

According to a preferred embodiment, the first plate is the pressure plate.

Advantageously, the axially acting resilient means consist of a diaphragm, and the external half-plate is provided with a support bead for the diaphragm.

The adjustment ramp is preferably carried by the internal periphery of the external half-plate; in a variant, the adjustment ramp is carried by the external periphery of the external half-plate.

The adjustment and support ramps are preferably helical threads whose axis is the axis of the clutch.

In a variant, the adjustment ramp consists of a series of ramps extending circumferentially at the end of an annular piece made from cropped and bent sheet metal.

The unidirectional means is preferably a split segment rotationally fixed to the first plate at at least one point.

In a variant, the unidirectional means is a helically wound snap ring rotationally fixed to the first plate at at least one point.

The control means are preferably controlled by the axially acting resilient means.

Advantageously, the control means comprise a break in the form of a tongue, secured or not to the axially acting resilient means, adapted to cooperate with one of the ramps; the tongue is in the form of a pin mounted for articulation.

According to another embodiment, the control means are sensitive to the centrifugal force and/or to an acceleration force.

The control means preferably consist of a U-shaped resilient tongue carried by the cover.

In a variant, the control means comprise a lever articulated on the internal half-plate and its two arms are adapted to cooperate with the unidirectional means.

According to another variant, the control means comprise one (or more) cams mounted so as to be eccentrically articulated on the internal half-plate and adapted to cooperate with the external half-plate.

The control means comprise a snap ring carried by the internal half-plate and adapted to cooperate, under the effect of the centrifugal force, with the external half-plate in order to prevent the latter from turning in the direction permitted by the unidirectional means.

The unidirectional means is a snap ring and the control snap ring and the unidirectional snap ring are in a single piece.

The unidirectional means is a snap ring and a weight, sensitive to the centrifugal force and/or to the angular acceleration, is associated with it in order to brake, beyond a certain rotation speed or a certain angular acceleration, the external half-plate.

Preferably, at least one of the snap rings is subjected to the circumferential action of a spring.

According to yet another variant, the control means comprise an elastic means exerting a substantially tangential snap ring and adapted to cooperate with the external half-plate under the action of the unidirectional means moved by inertia.

The adjustment ramps cooperate with counter-ramps or support ramps carried by a ring fixed to the internal half-plate by friction, which is elastically controlled.

According to another embodiment, the piece consisting of two half-pieces is the cover.

The internal half-cover preferably consists of the central part of the bottom of the cover, being externally threaded, whilst the external half-cover is internally threaded so that the internal and external half covers are screwed to one—another.

Advantageously, a brake in the form of a wedge, controlled by the diaphragm, can be inserted between the two half-covers.

Other characteristics and advantages of the invention will also emerge from the description which follows, by way of example, with reference to the accompanying drawings, in which.

Figure 15:
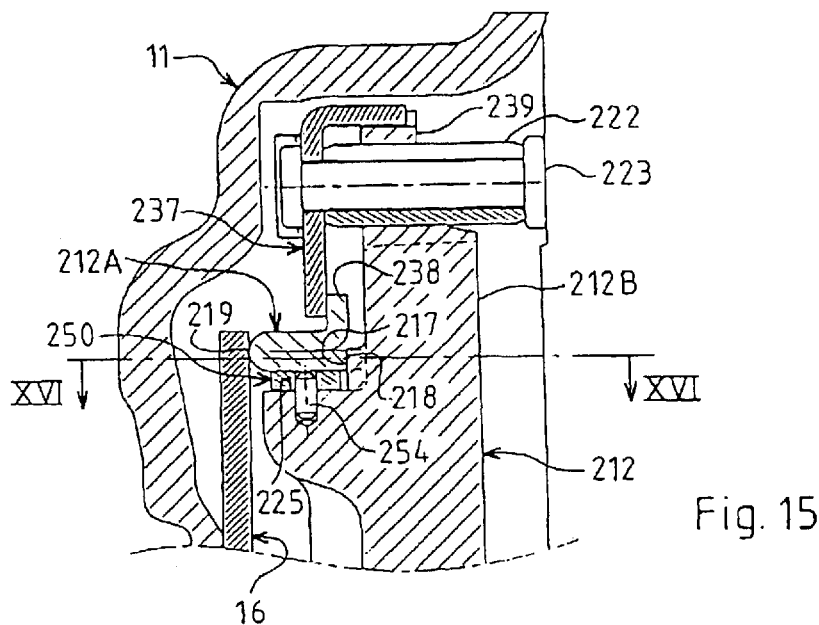
Figure 16:
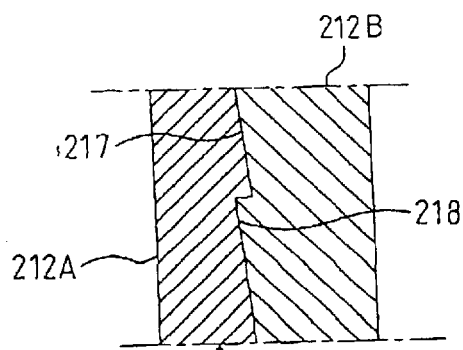
Figure 17:
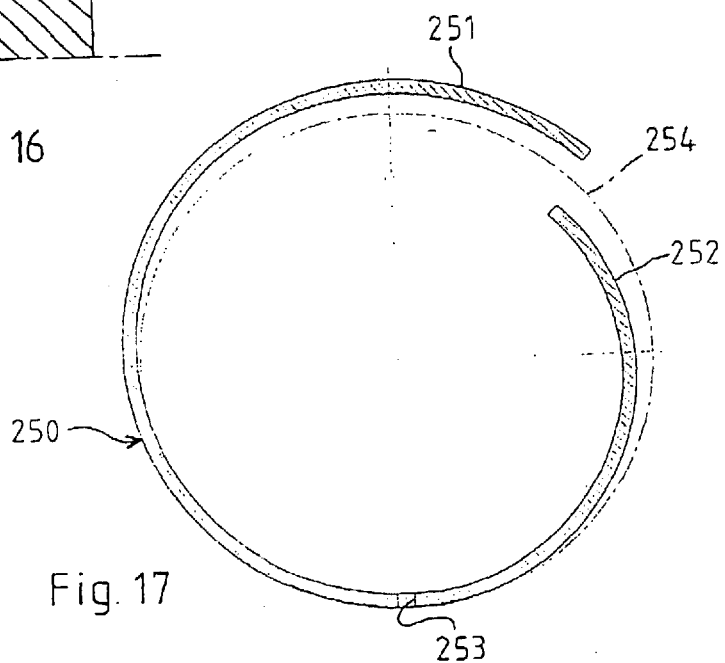
Figure 18:
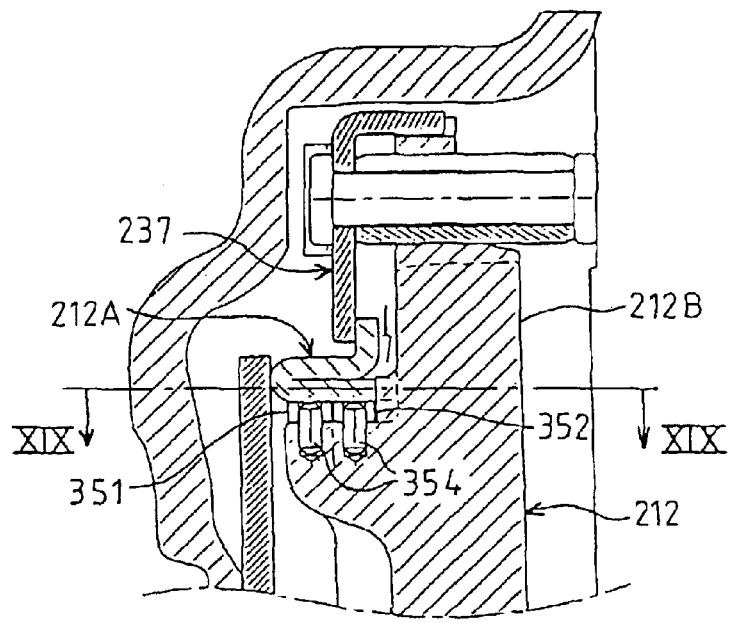
Figure 19:
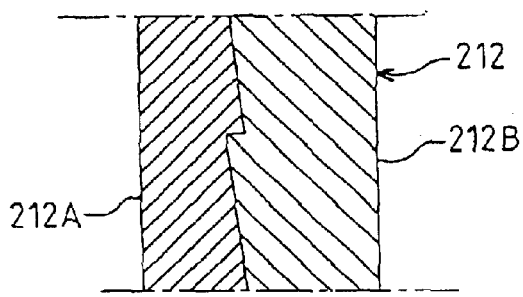
Figures 20, 21:
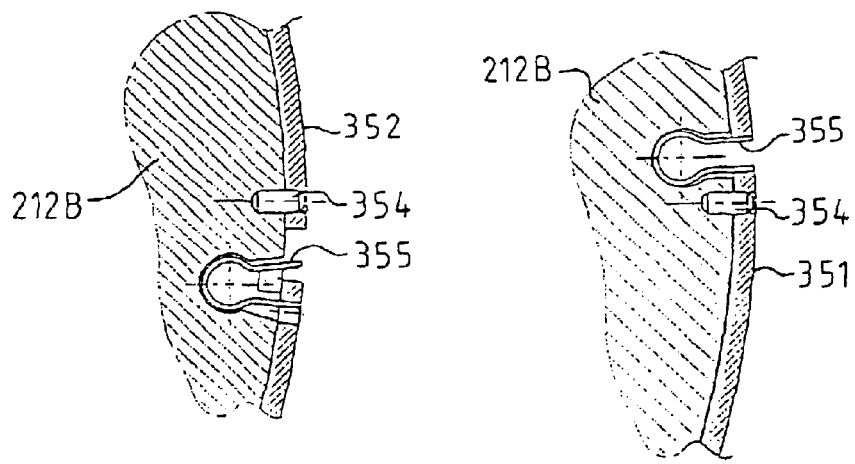

FIGS. 7 and 8 concern yet another variant, FIG. 7 being a view in section along VII—VII in FIG. 8;

FIGS. 9 and 10 concern yet another variant, FIG. 9 being a view in section along IX—IX in FIG. 10;

FIGS. 11 to 13 concern yet another variant, FIG. 12 being a cross-section along XII—XII in FIG. 11 and FIG. 13 a perspective view to a smaller scale of the spiral snap rings in FIG. 11;

FIG. 14 is a view similar to FIG. 13 and depicts a variant;

FIGS. 15 to 17 concern yet another variant, FIG. 16 being a cross-section along XVI—XVI in FIG. 15 and FIG. 17 a perspective view to a smaller scale of the open ring in FIG. 15;

FIGS. 18 to 21 concern yet another variant, FIG. 19 being a cross-section along XIX—XIX in FIG. 18 and FIGS. 20 and 21 partial transverse sections, of FIG. 18.

Figure 1:
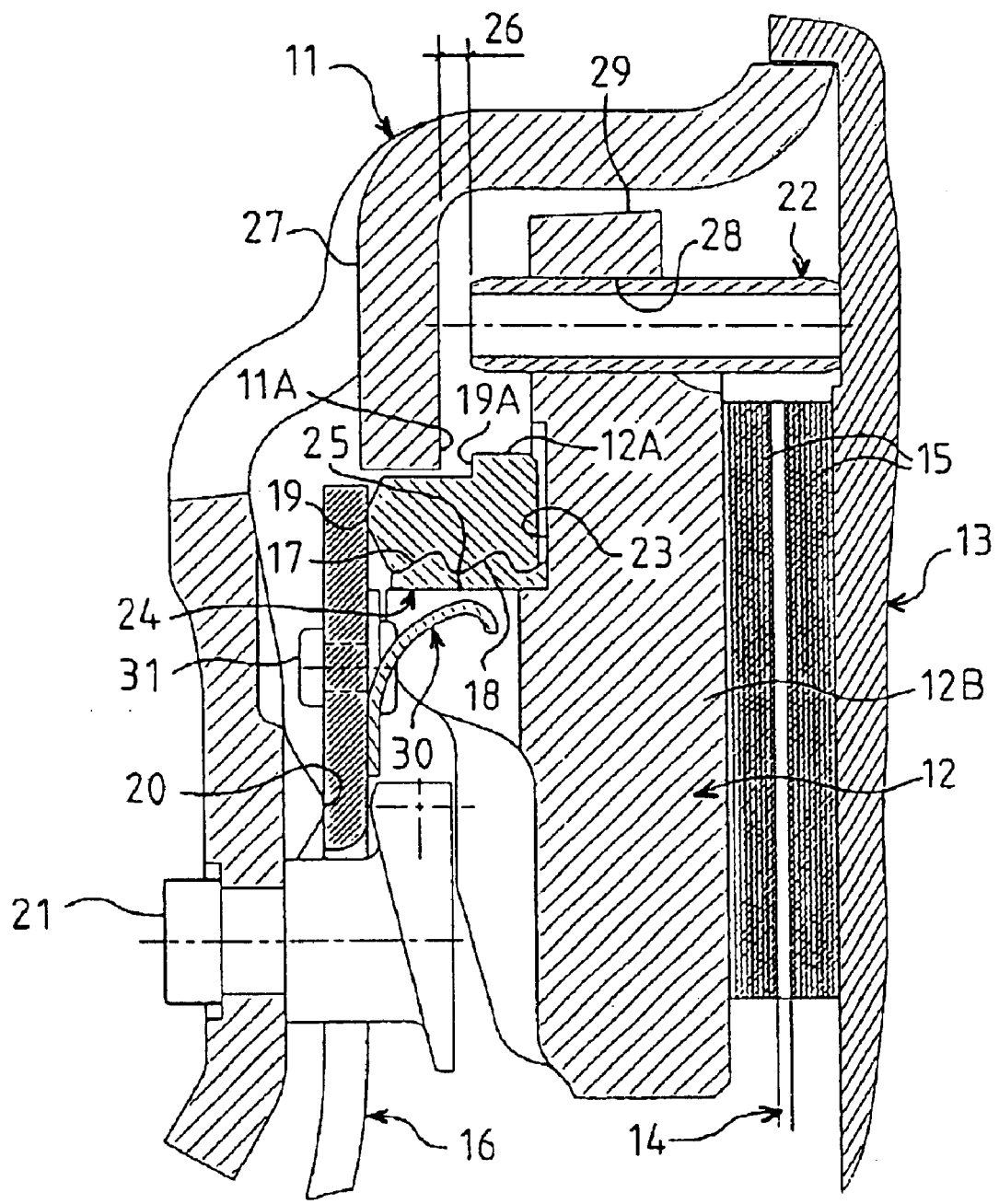
FIG. 1 is a partial view in axial section of a friction clutch according to the invention.
Figure 22:
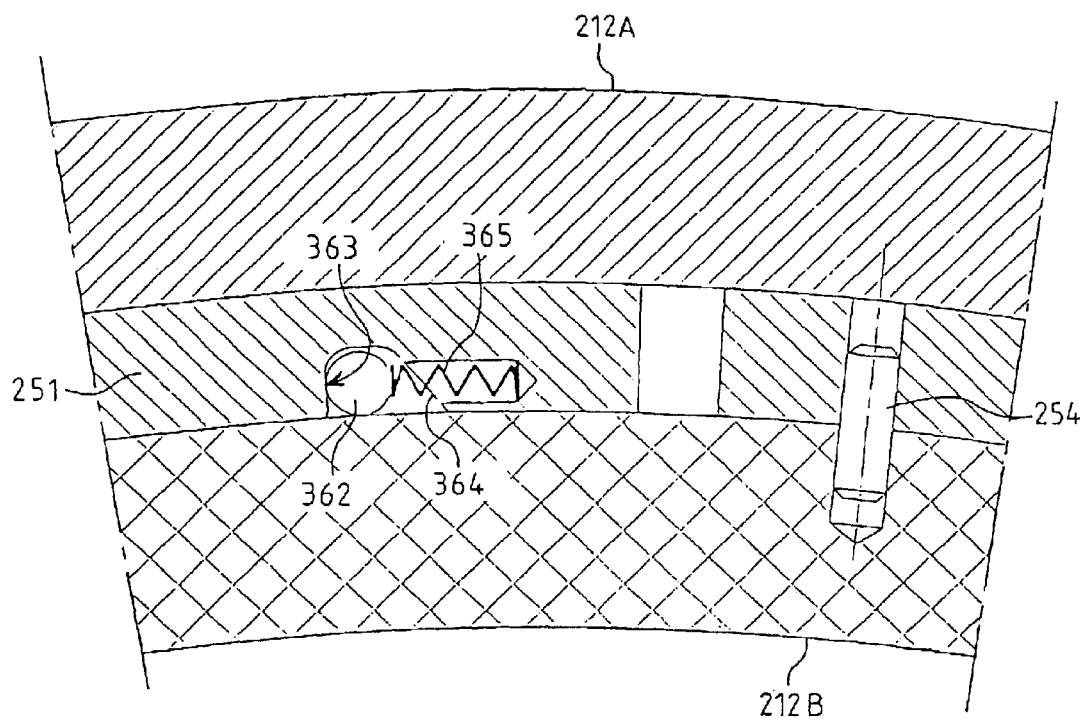
Figure 23:
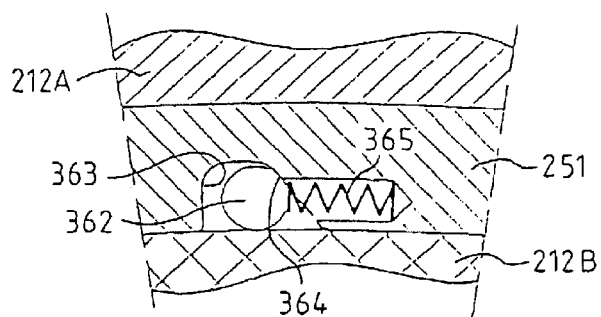
Figures 24, 25:
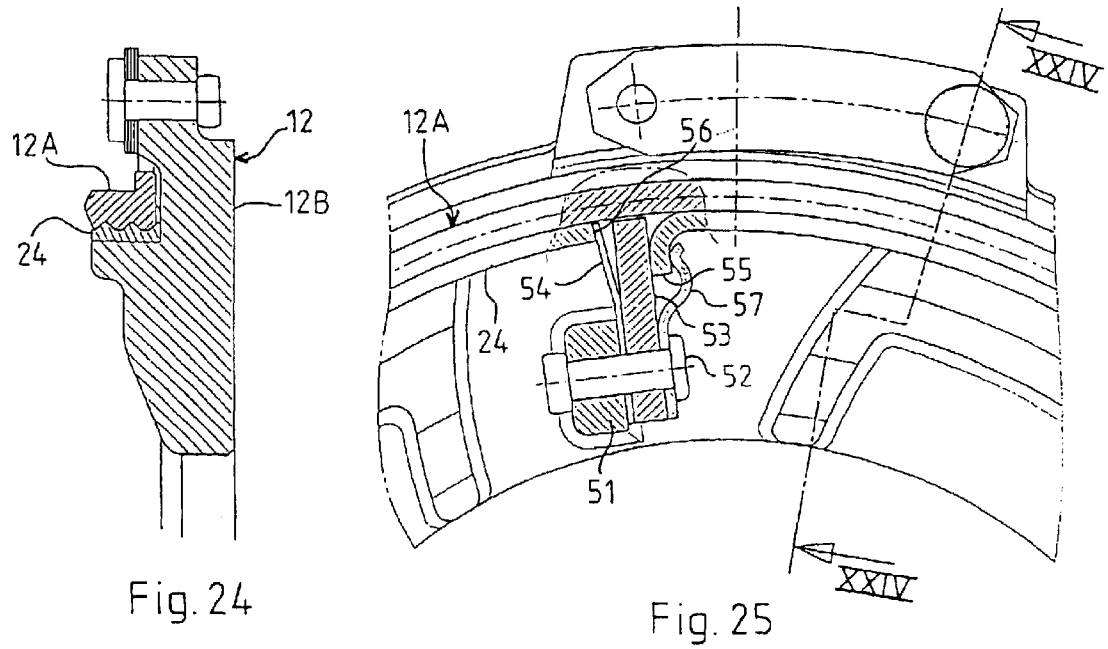
Figure 26:
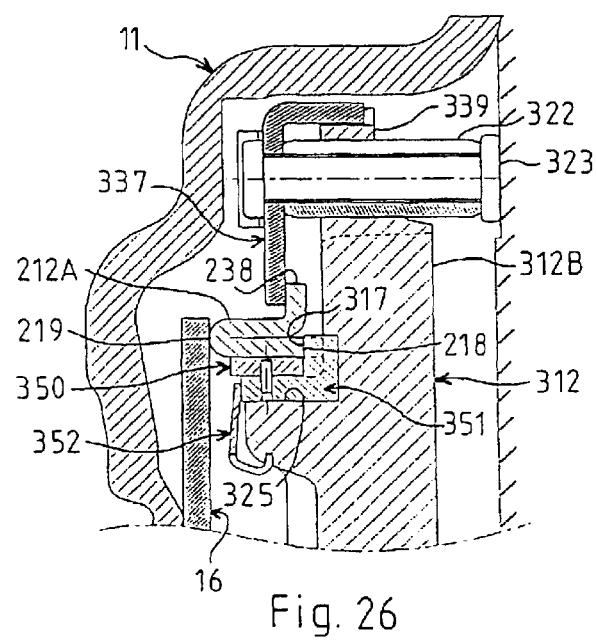
Figure 27:
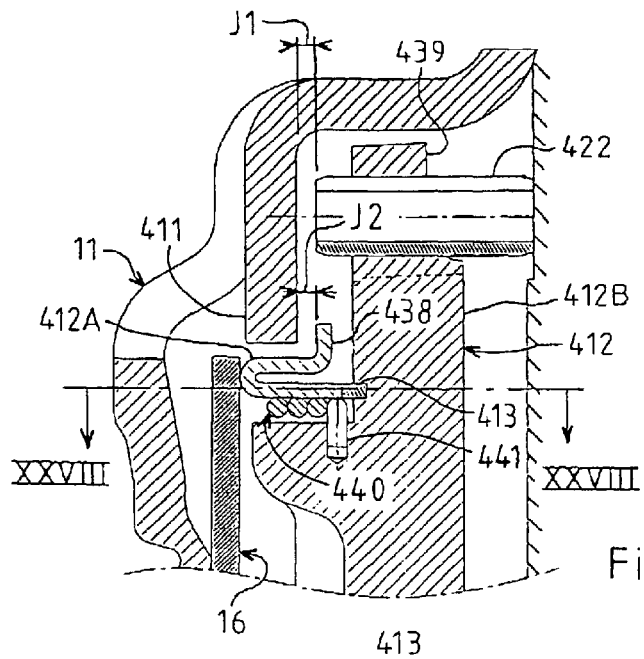
Figure 28:
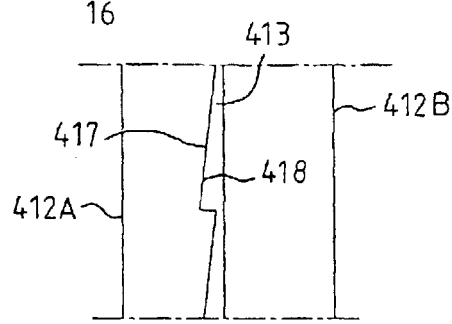
Figure 33:
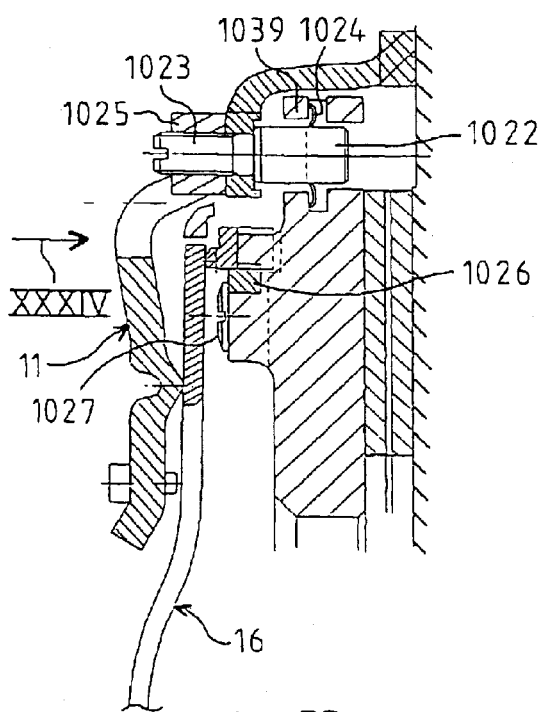
Figure 34:
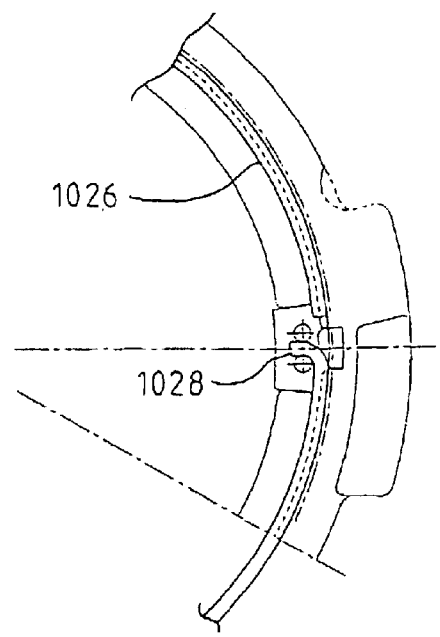
Figure 39:
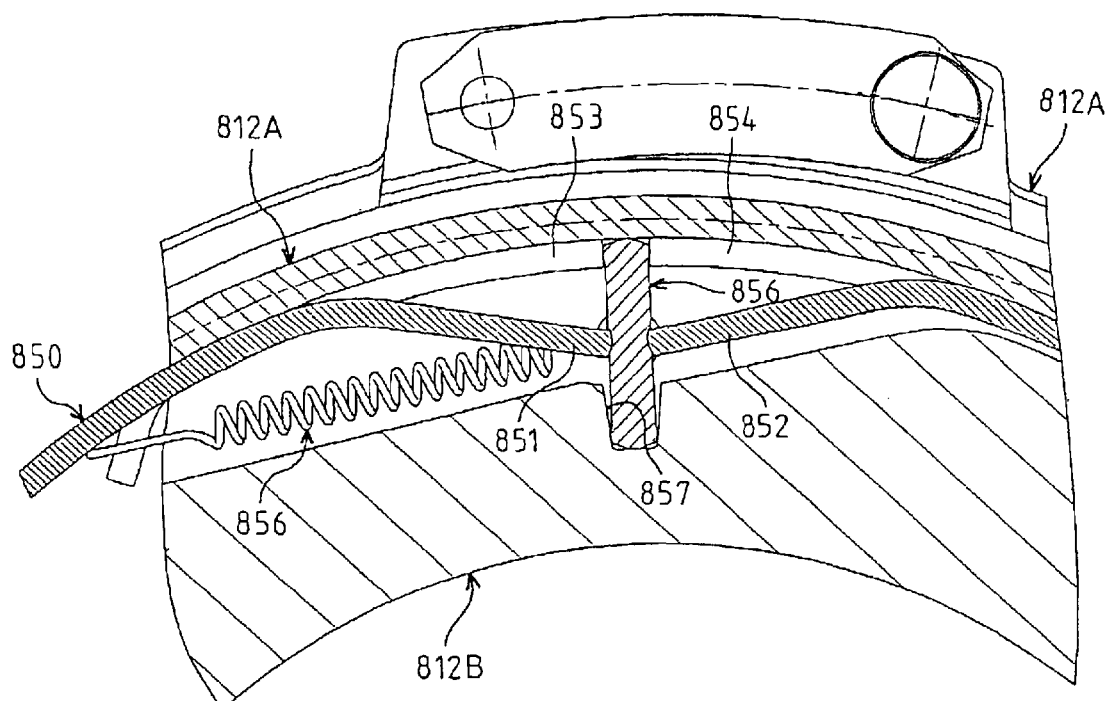
Figure 40:
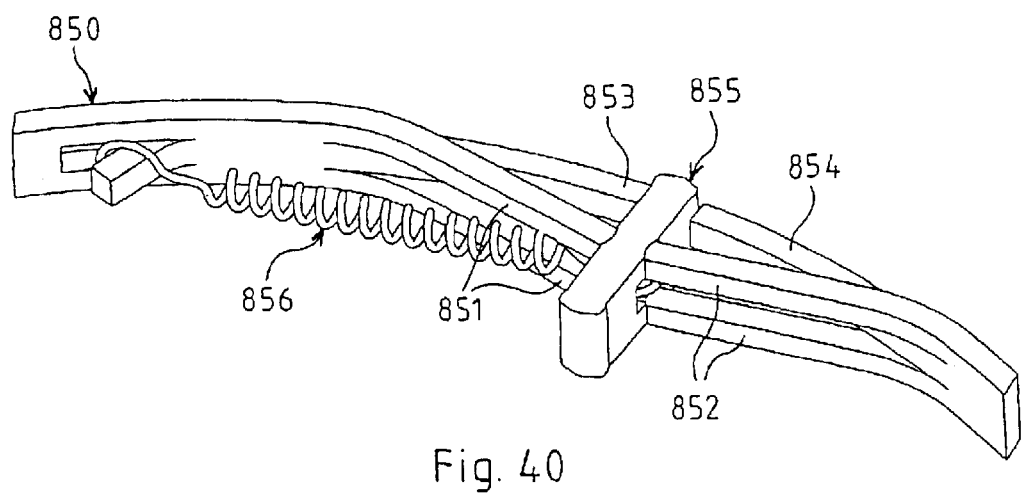
Figure 41:
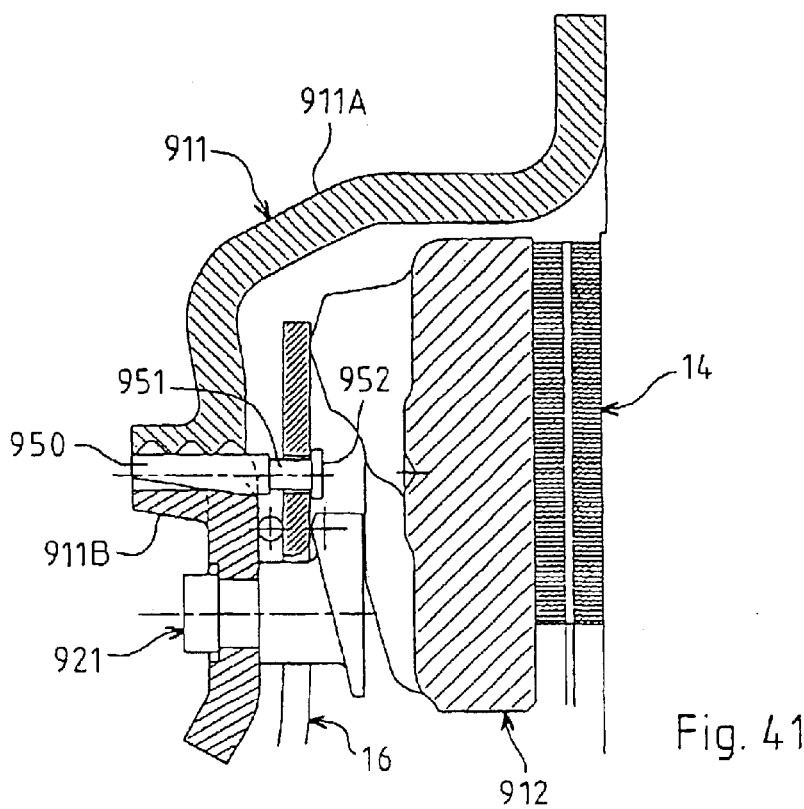
Figure 42:
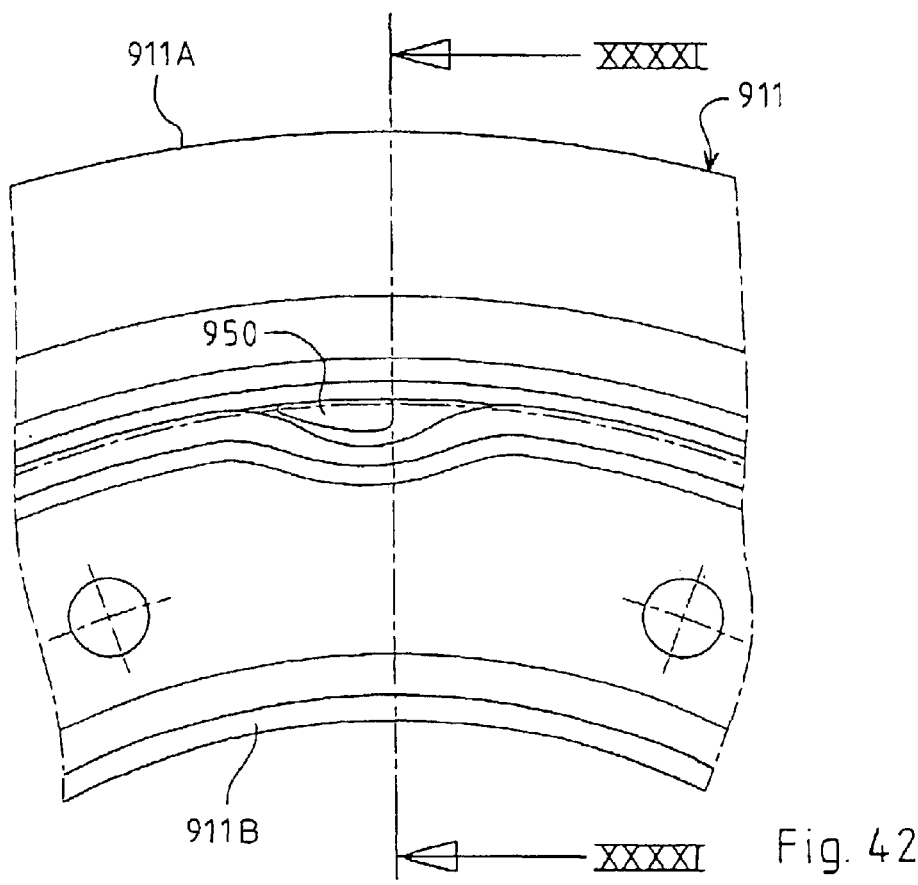
Figure 43:
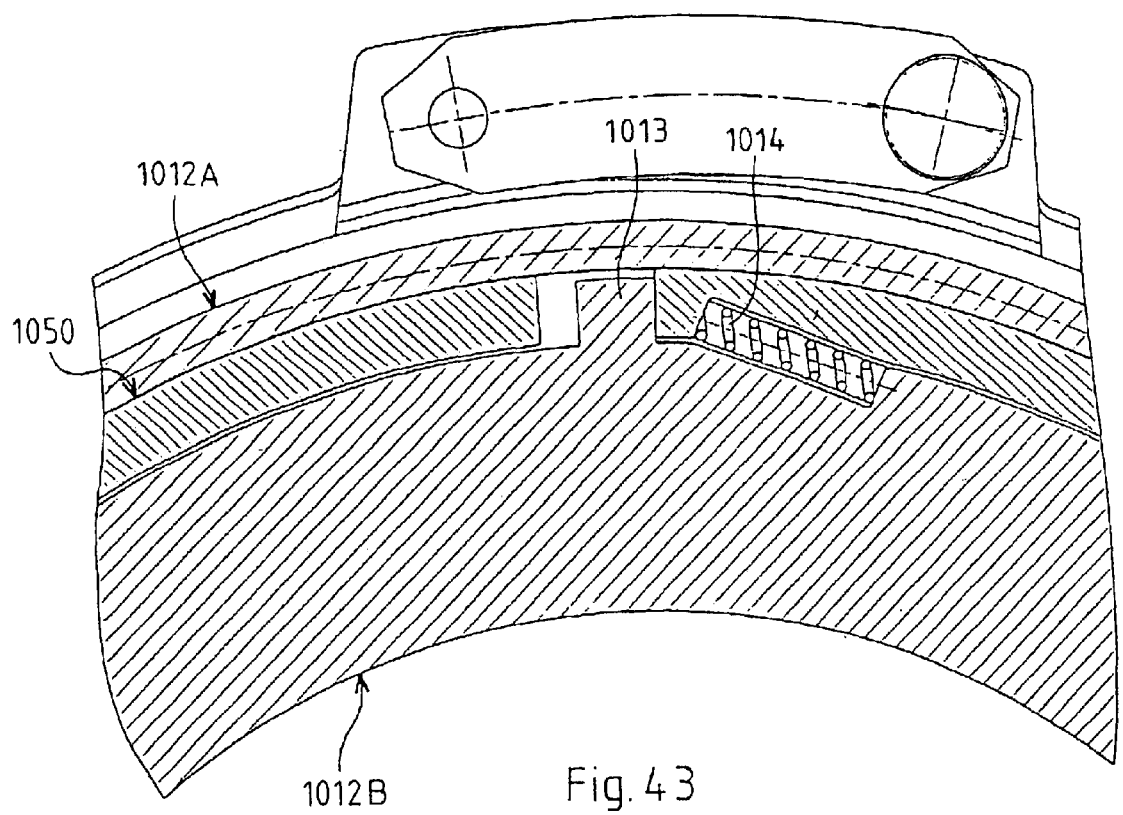
Figure 44:
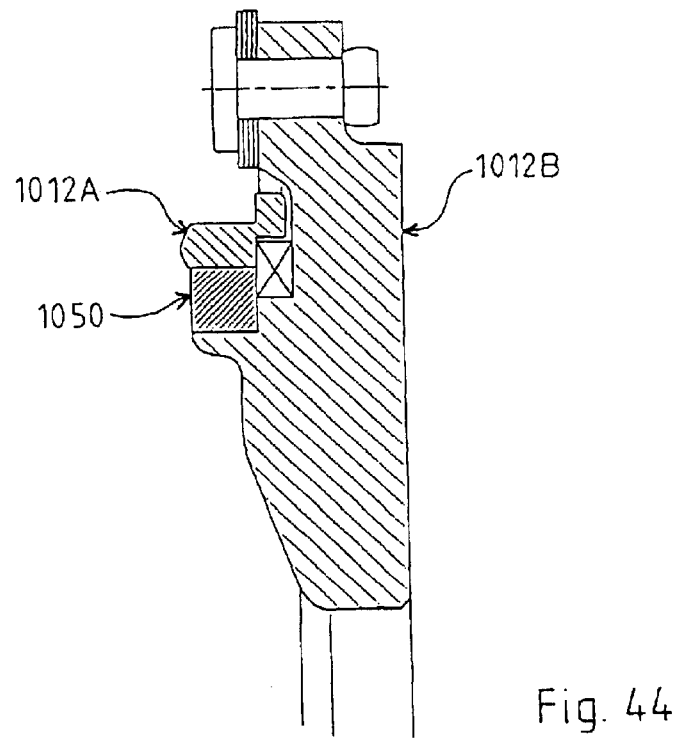

FIGS. 22 and 23 are partial sections illustrating the functioning of another variant of control means according to the invention;

FIGS. 24 and 25 concern yet another variant, FIG. 24 being a view in section along XXIV—XXIV in FIG. 25;

FIG. 26 is a view similar to FIG. 1 and concerns yet another variant;

FIGS. 27 and 28 concern yet another variant, FIG. 28 being a cross-section along XXVIII—XXVIII in FIG. 27;

FIGS. 29, 30, 31, 32 are views similar to FIG. 1 and each concern yet another variant;

FIGS. 33 and 34 concern yet another variant, FIG. 33 being a partial view in axial section similar to FIG. 1 and FIG. 34 a view in the direction of the arrow XXXIV in FIG. 33, showing another control means;

FIGS. 35 and 36 concern yet another variant, FIG. 36 being a partial plan view;

FIGS. 37 and 38 concern yet another variant, FIG. 38 being a partial plan view;

FIGS. 39 and 40 concern yet another variant, FIG. 39 being a partial view in transverse section and FIG. 40 a partial view in perspective;

FIGS. 41 and 42 concern yet another variant, FIG. 41 being a view similar to FIG. 1 and FIG. 42 a partial axial view;

FIGS. 43 and 44 concern yet another variant, FIG. 43 being a partial view along the axis and FIG. 44 a partial view in transverse section;

FIGS. 45 to 47 concern yet another variant, FIG. 45 being a view similar to FIG. 1, FIG. 46 a partial view in the direction of the arrow XXXXVI in FIG. 45 and FIG. 47 a partial cross-section along XXXXVII—XXXXVII in FIG. 45.

Referring to FIG. 1, it can be seen that the clutch comprises a reaction plate 13 intended to be rotationally fixed to a driving shaft, here the crankshaft of the thermal engine of a motor vehicle, a friction disc 14 carrying friction linings 15 at its external periphery and intended to be rotationally fixed to a driven shaft.

A cover 11 is fixed to the reaction plate 13 and axially acting resilient means, here a diaphragm 16, acts between the cover 11 and a pressure plate 12 rotationally fixed to the cover 11 but able to move axially with respect to it, the diaphragm 16, by bearing on the cover 11, applying the pressure plate 12 against the friction disc 14 so that the friction linings 15 are clamped between the pressure 12 and reaction 13 plates; as known per se, the diaphragm 16 is mounted so as to be articulated on the cover 11 by small columns 21 and bears on the cover along a circumferential surface 20 which it has.

The pressure plate 12 consists of two half-plates; a half-plate 12A referred to as the external half-plate and a second half-plate 12B referred to as the internal half-plate, which directly faces the friction disc 14; tangential tongues conventionally connect the internal half-plate 12B to the cover 11, for connection, with axial mobility, of the pressure plate 12 with the cover 11.

The two half-plates 12A, 12B are fixed with rotation to the driving shaft but able to be moved axially, with respect to one another, under the action of a device for taking up play due to wear.

The play take-up device comprises circumferentially disposed complementary ramps 17, 18 associated respectively with each of the two half-plates 12A, 12B.

More precisely, the external half-plate 12A is an annular piece housed in a groove 23 in the internal half-plate 12B; the said groove 23 extends axially, at the border of a step 25, whilst being open in the direction of the cover 11; the axial length of the annular piece 12A is greater than the axial depth of the groove 23 and its end which faces the cover is shaped as a support bead 19 for the diaphragm 16.

On its internal axial face, that is to say the one turned towards the axis of the clutch, the annular piece 12A carries a helical thread 18, the axis of which is the axis of the clutch, constituting the adjustment ramp.

Through its helical thread 18, the annular piece 12A cooperates with a helical thread 17, complementary to the thread 18, produced at the periphery of a split segment 24 and constituting the support ramp.

The segment 24 surrounds the step 25 and has one of its ends immobilised rotationally with respect to the half-plate 12B, for example by means of a radial or axial pin.

The direction of winding of the helical threads constituting the support 17 and adjustment 18 ramps is such that, when the half-plate 12A is subjected to an acceleration, the adjustment ramp 18 moves in rotation with respect to the support ramp 17 and the half-plate 12A, during this movement, advances axially with respect to the internal half-plate 12B in the direction of the cover 11; for accelerations in the opposite direction the friction of the adjustment ramp 18 on the support ramp 17 expands the segment 24 which carries the latter, this expansion resulting in a rotational locking of the external half-plate 12A with respect to the segment 24, and therefore relative to the internal half-plate 12B; as can be seen, the segment 24 fulfils the role of a unidirectional means; thus, by virtue of the arrangement which has just been described, the lack of periodicity of the thermal engine suffices to make the external half-plate 12A emerge axially from the groove 23 if, of course, nothing opposes this emerging, as explained below.

The play take-up device also comprises a release consisting of a radially expanding elastic split pin 22, introduced into a passage 28 which it passes through provided in a radial end lug 29 of an internal half-plate 12B; the diameter of the passage 28 is less than the external diameter of the pin 22 in the free state so that the latter is mounted for friction in the passage 28 and immobilised axially with respect to the internal half-plate 12B; this immobilisation friction is provided at a value such that it can be overcome by the axial force due to the diaphragm 18 and such that it cannot be overcome by the return force to which the pressure plate 12 is subjected, a return force such as the one resulting normally from tangential tongues rotationally coupling the said pressure plate 12, here the half-plate 12B, and the cover 11.

The play take-up device according to the invention functions as follows.

FIG. 1 depicts the clutch engaged, the friction linings 15 being new and clamped between the pressure plate 12 and the reaction plate 13.

In this position, one end of the pin 22 is in abutment on the internal face of the reaction plate 13, and the external half-plate 12A is in the retracted position axially close to the bottom of the groove 23 in the internal half-plate 12B.

When the clutch is disengaged, the diaphragm 16 has tilted as far as its end of disengagement travel position; the support bead 19 is no longer in contact with the diaphragm; the other end of the pin 22 is in contact with the cover 11, here the internal face of a radial lug 27 issuing from the cover 11; thus the pin 22 is mounted between this internal face and that of the reaction plate 13 with an axial play 26 which illustrates the axial travel of the pressure plate 12 during disengagement.

When there is wear, in particular on the friction linings 15, the pressure plate 12 moves closer to the reaction plate 13, the clutch being engaged; during this movement, the pin 22 being held axially by its being put in abutment on the reaction plate 13, the lug 29 on the internal half-plate 12B slides over the pin 22 because of the axial force of the diaphragm 16.

On disengagement after wear, firstly, the pin 22 has come into abutment on the cover 11, and then the diaphragm has continued its travel and has become detached from the support bead 19; the internal half-plate 12B having retracted only by a quantity equal to the play 26, the shoulder 19A on the support bead 19 is at a distance from the cover stop 11A corresponding to the wear measured axially; secondly, the external half-plate 12A, which is no longer subject to the action of the diaphragm, is free to move in the direction of the diaphragm 16, by virtue of the accelerations to which it is subject because of the lack of periodicity of the engine, as explained above; the emergence of the external half-plate 12A continues until it comes into abutment on the shoulder 19A of the support bead 19 on the cover stop 11: thus the play due to wear has been taken up.

When the play due to wear has been taken up, and the clutch is once again engaged, the working position of the diaphragm 16 is identical to that which it had initially, in the new state.

In the embodiment depicted in FIG. 1, the control means comprise a break 30 adapted to cooperate indirectly with one of the ramps 17, 18, here with the ramp 18 carried by the split segment 24, for a certain position of the diaphragm 16.

Here the break 30 is in the form of a tongue made from cropped and curved sheet metal, fixed, for example by a rivet 31, to the Belleville washer part of the diaphragm 16 whilst being situated on the face thereof turned towards the pressure plate 12; the brake-tongue 30 extends in a radial scallop provided in the step 25 and its end, advantageously curved, is adapted to cooperate with the internal cylindrical face of the split segment 24.

When the clutch is engaged, the brake-tongue 30 is at a distance from the split segment 24, FIG. 1; when the clutch disengages, the diaphragm tilting about the small columns 21, the brake-tongue 30 moves closer to the split segment 24: in a first part of this disengagement travel, the brake-tongue 30 does not always cooperate with the split segment 24 and a takeup operation is possible; in a second and last part of the disengagement channel of the diaphragm 16, the brake-tongue 30 transmits a radial thrust force onto the split segment 24, preventing the latter from causing the external half-plate 12A to turn and from performing a take-up operation.

Naturally, advantageously, several tongues 30 can be provided, distributed circumferentially, for example three tongues 30 at one hundred and twenty degrees from each other.

Figure 2:
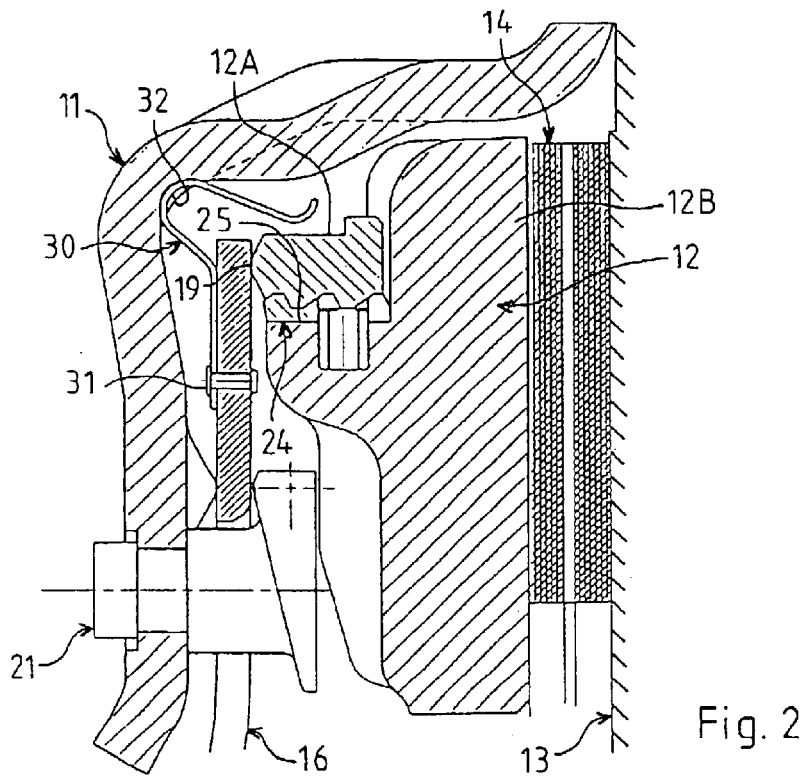
FIGS. 2 and 3 are similar to FIG. 1 and concern a variant.
Figure 3:
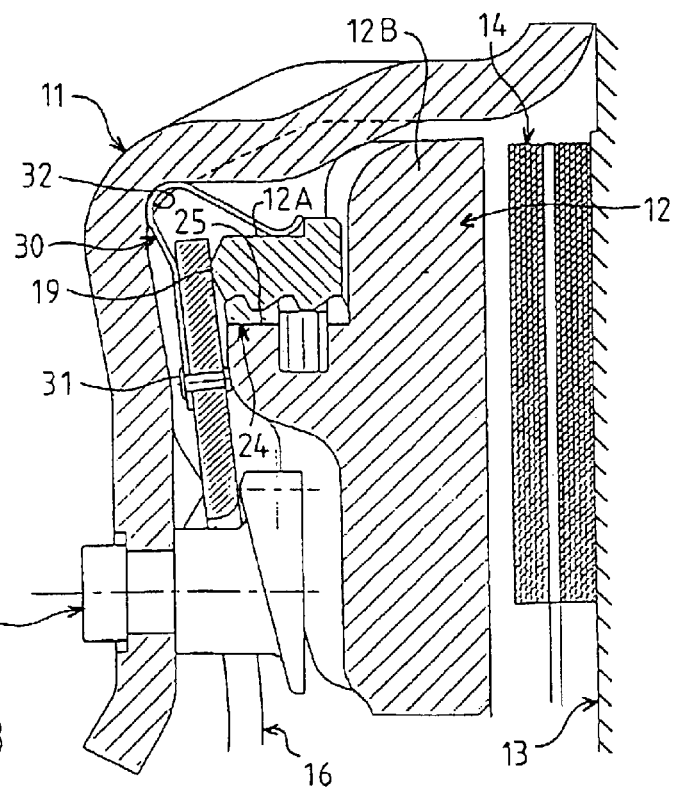

According to the variant in FIGS. 2 and 3, each brake-tongue 30 is in the form of a pin, one arm of which is fixed to the diaphragm 16; here this arm is situated on the face of the diaphragm 16 turned towards the bottom of the cover 11 and the other arm is adapted to cooperate with the external cylindrical face of the external half-plate 12A; the arched part 32 of the tongue 30 which connects the two arms is in abutment on the cover 11, in a recess therein, also arched in shape, and fulfils the role of an articulation converting the axial force applied to the tongue 30 by the diaphragm 16 into a radial force which can be applied to the external half-plate 12A.

FIG. 2 depicts the clutch in the engagement position, the tongue 30, or more precisely its advantageously rounded free end, being at a distance from the external half-plate 12A; FIG. 3 depicts the clutch in the end of disengagement position, the tongue 30 immobilising the external half-plate 12A.

According to this variant, the arm actuating the tongue 30 is subjected to centrifugal force and account must be taken of it for the adjustment of the moment as from which the control means no longer allow the functioning of the wear take-up device.

Figure 4:
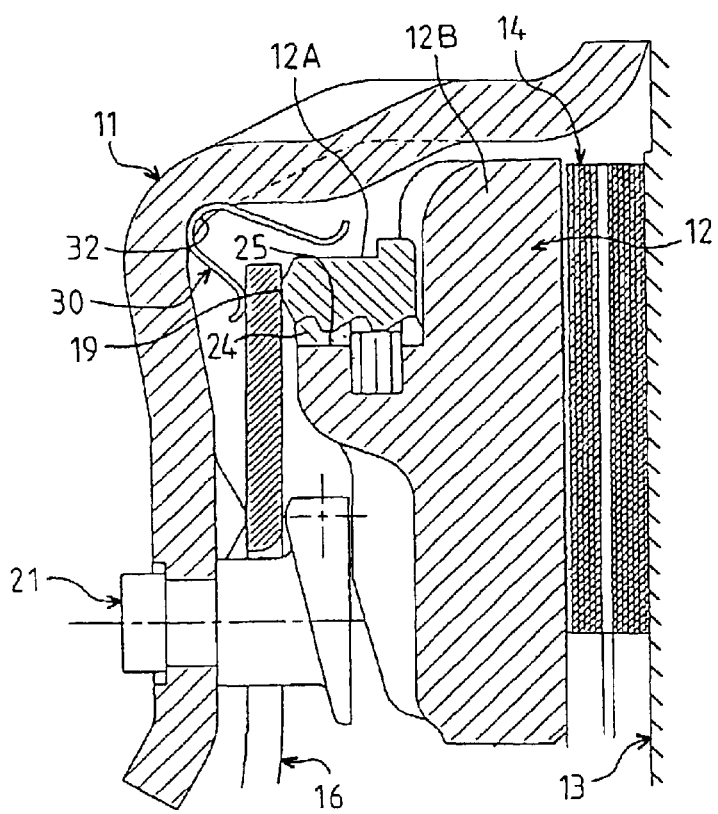
FIGS. 4 and 5 are similar to FIG. 4 and concern another variant.
Figure 5:
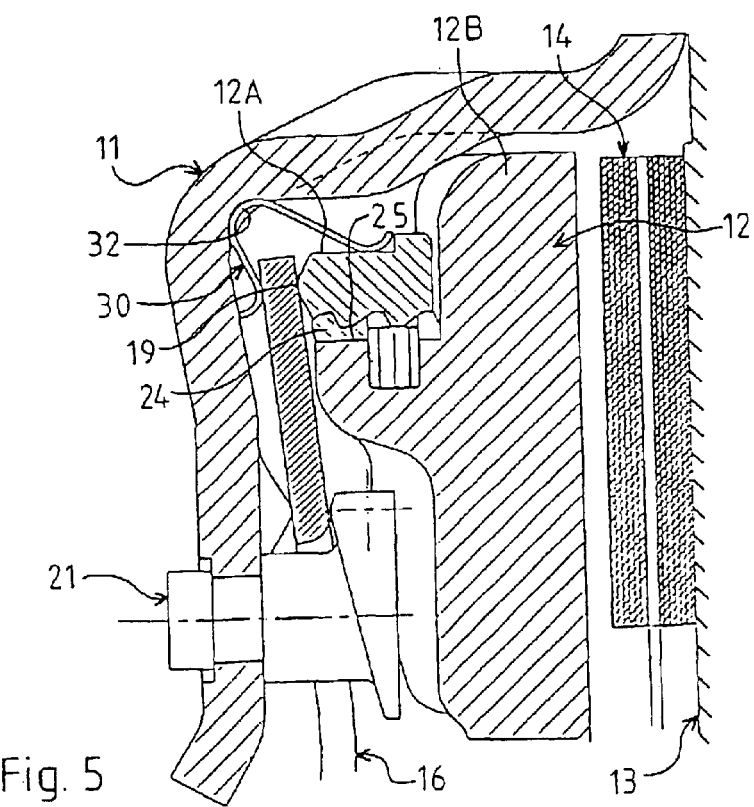

The variant in FIGS. 4 and 5 is similar to the one which has just been described with regard to FIGS. 2 and 3 except that here the tongue 30 is not fixed to the diaphragm 16 but held elastically in position between the cover 11 and the diaphragm 16.

It is possible of course to make the control means sensitive only to centrifugal force.

Figure 6:
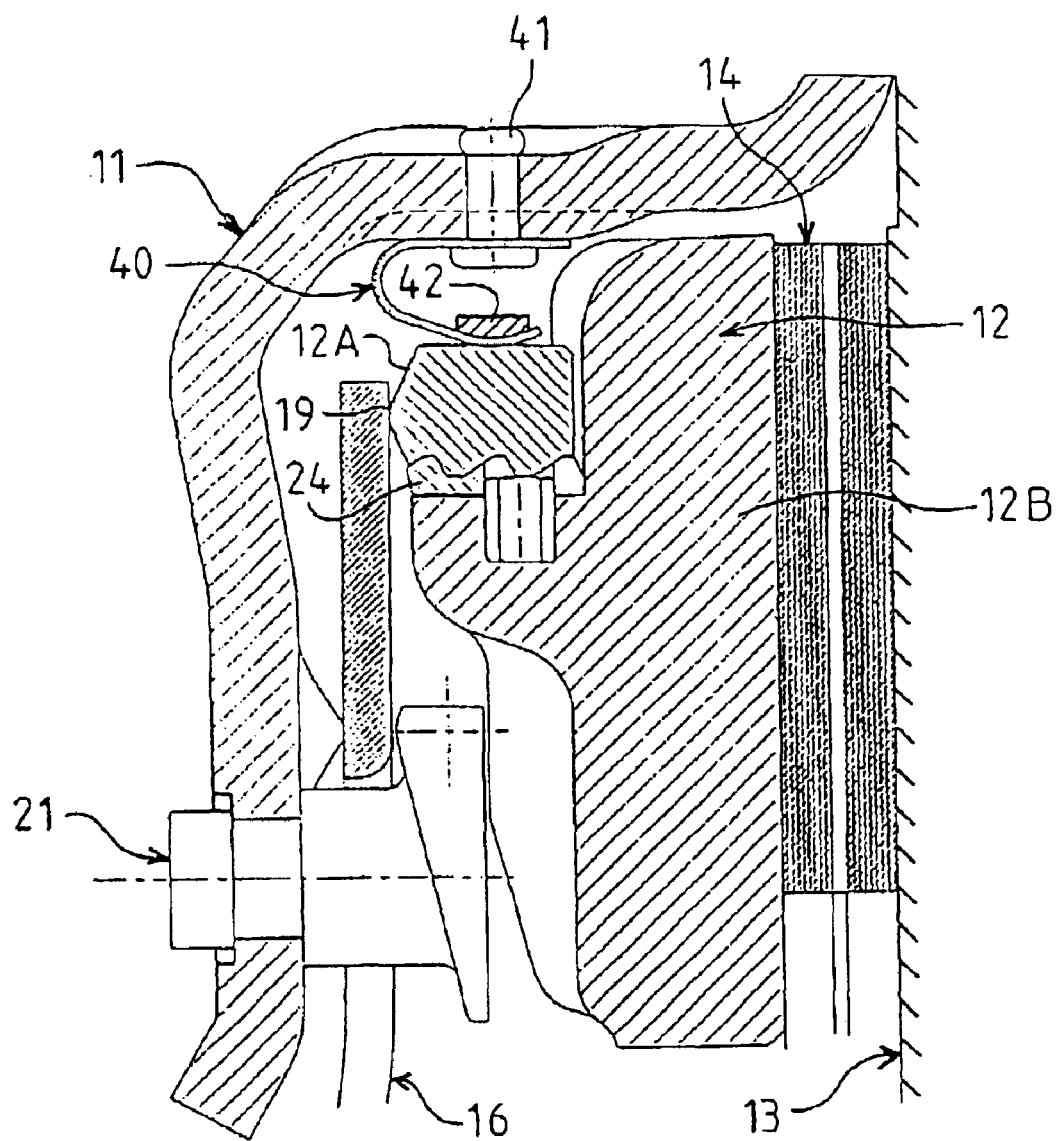
FIG. 6 is a view similar to FIG. 1 and concerns yet another variant.

Thus, in FIG. 6, the control means comprise a brake consisting of the free arm of a U-shaped elastic tongue 40, the other arm of which is fixed to the cover 11, here to an axially extending cylindrical skirt which the cover 11 has, by a rivet 41; the free arm of the brake 40 is in elastic abutment on the external face of the external half-plate 12A, which it prevents from turning; as from a certain rotation speed, for example 400 revolutions per minute under the effect of the centrifugal force, the brake 40 releases the external half-plate 12A and, under the conditions described above, allows a take-up operation.

The centrifugal effect can be controlled by the choice of a weight 42 attached to the free arm of the brake 40.

According to a variant in FIGS. 7 and 8, the control means comprise a lever 50 mounted so as to be articulated about a shaft 51 carried by the internal half-plate 12B of the pressure plate 12; on each side of the shaft 51, the two arms 52, 53 of the lever 50 extend; the first arm 52 has its end, advantageously rounded, in contact with the internal face of the split segment 24 by virtue of the action of a spring 54 which acts on the first arm 52 whilst bearing on the shaft 51; the second arm 53 is at a distance from the said internal face, as well as its end, also advantageously rounded; this second arm 53 is more weighty than the first arm 52, because of its length and/or a weight 55 which it carries; consequently, as from a certain speed of rotation, the lever 50 turns about the shaft 51 under the effect of the centrifugal force which acts against the spring 54: within a certain range of speeds, neither of the two arms 52, 53 is in contact with the split segment 24 and a take-up operation is allowed; beyond a certain speed, it is the second arm 53 which comes into contact with the split segment 24 and prevents any taking up.

Naturally, several levers such as the lever 50 can be provided, for example three levers 50 equally distributed circumferentially.

FIGS. 9 and 10 show a variant in which the external half-plate 112A of the pressure plate 12 is an annular piece made from cropped and bent sheet metal carrying axially, on the one hand the support bead 119 with which the diaphragm 16 cooperates and on the other hand a series of ramps 118 extending circumferentially and cooperating with complementary ramps 117 in the form of studs issuing from the internal pressure plate 112B.

This annular piece 112A is associated with a cam 133 mounted for rotation about a shaft 134 parallel to the shaft of the clutch and carried by the internal half-plate 112B of the pressure plate 112.

Here the cam 133 is produced in the form of a disc with a circular cross-section which cooperates through its periphery with the internal cylindrical face of the annular piece 112A; the shaft 134 is offset, to the left as seen in FIG. 10, with respect to the diameter 135 which passes through the centre of the cam 133.

A light prestressing spring 136 provides contact between the cam 133 and the annular piece 112A; consequently, by virtue of this arrangement, a unidirectional free wheel function is provided, the annular piece 112A being allowed to move in the direction of the arrow F with respect to the internal half-plate 112B but not being able to move in the opposite direction; naturally the direction of movement in the direction of the arrow F corresponds, by cooperation of the ramps 117, 118, to a movement for taking up, the support bead 119 moving closer to the bottom of the cover 11 in order, after wear, to compensate for this.

As will easily be understood, as from a certain speed of rotation, the centrifugal force strongly presses the cam 133 onto the annular piece 112A, which prevents the latter from turning, even in the direction of the arrow F; the cam 133 thus constitutes a means of controlling the play take-up device, sensitive to the speed of rotation of the clutch.

The variant according to FIGS. 11 to 13 has as before an annular piece 212A similar to the annular piece 112A in the previous variant and having ramps 218 adapted to cooperate with counter-ramps 217 provided at the periphery of a ring embedded in a groove in the internal half-plate 212B of the pressure plate 212; here the split elastic pin 222, constituting the release and passing through a lug 239 on the internal half-plate 212B, carries an axial rivet 223 fixing, to the pin 222, a radial stop lug 237 with which the annular piece 212A is adapted to cooperate axially in abutment, by virtue of a radial lug 238 which it has, so that, whatever the wear, the axial position of the support bead 212 is always the same.

Here the unidirectional means providing the non-return function associated with the annular piece 212A is a snap ring 240 wound helically on three turns, according to the example depicted; at rest, the snap ring 240 has a diameter slightly greater than that of the internal periphery of the annular piece 212A, so that, once mounted, it is radially clamped on the said periphery and at a slight radial distance from the step 225; this slight distance has been exaggerated in FIG. 11 in order to facilitate reading thereof; one end of the snap ring 240 is bent radially at 245, FIG. 13, in order to be introduced into an appropriate housing provided radially in the step 225 in the internal half-plate 212B, to which the snap ring 240 is therefore rotationally fixed; thus, by virtue of this arrangement, the annular piece 212A can turn with respect to the internal half-plate 212B in the direction corresponding to taking up but not in the opposite direction.

Here, disposed axially alongside the first snap ring 240, there is provided a second snap ring 242 which surrounds the step 225 in which there is also housed one of its radially bent ends 243.

At rest, the diameter of the second snap ring 242 is less than the diameter of the external cylindrical surface of the step 225, so that, once mounted, it is clamped radially on the said cylindrical surface and at a radial distance from the annular piece 212A.

Normally the snap ring 242 does not interfere with the functioning of the play take-up device, at least up to a certain speed of rotation at which, under the effect of the centrifugal force, it increases in diameter until it comes into contact with the annular piece 212A; the winding of the snap ring 242A from its anchoring at 243 is in the direction opposite to that of the snap ring 240 from its anchoring 241 so that, as from the said speed of rotation, the annular piece 212A is prevented from turning both in one direction and in the other.

FIG. 14 is similar to FIG. 13 and shows a variant in which the two snap rings 240 and 242 form part of the same wire suitably wound on each side of a common anchoring loop 244.

FIGS. 15 to 17 show a variant almost identical to that which has just been described with regard to FIGS. 11 to 14; here the free-wheel and control functions are provided by an elastic split snap ring 250, for example, as shown, with a rectangular cross-section and consisting of two half snap rings 251, 252 connected according to a common part provided with a hole 253 for immobilisation by means of a radial stud 254 relative to the internal half-plate 212B; the shape of the snap ring 250 is such that, seen from above in FIG. 17, it is deformed with respect to a circle 254 passing through the common part which matches it and which is provided with a hole 253 so that a half snap ring, here 251, is external to the said circle 254 whilst the other half snap ring, here 252, is internal to the said circle 254; thus the half snap rings 251 and 252 fulfil the same role as the snap rings 240 and 242, respectively, in the previous variant.

It is possible to reinforce the friction on an internal or external cylindrical wall of a snap ring or of a half snap ring by associating it with a circumferentially acting elastic means forcing the snap ring, or the half snap ring, to open by increasing its diameter or to close by decreasing its diameter. And thus, referring to FIGS. 18 to 21, it can be seen that a snap ring 352, anchored at 354, FIG. 20, is closed on itself under the action of a spring 355 in the form of a pin, whilst the snap ring 351, anchored at 354, FIG. 21, is open through the spring 355 in the form of a pin.

In the previous variants, a snap ring or half snap ring fulfils the free-wheel function whilst another snap ring or half snap ring fulfils the control function; it is possible to have the two functions provided by the same snap ring, as in FIGS. 22 and 23; here, with the free-wheel snap ring 251, anchored at 254, there is associated a weight 262, such as a roller, as depicted; the latter is in a housing 363 provided in the snap ring 251 and open towards the internal half-plate 212B; transversely, the housing 363 carries a radial wall, in the face of which there is a wall in the form of a ramp 364; a circumferentially acting spring 365 moves the weight 362 away from the ramp 364. Thus, normally, the annular piece 212A is free to turn in the clockwise direction, as seen in FIG. 22; in the case of strong angular acceleration or when the speed of rotation is high, the weight 362, by virtue of the ramp 364, strongly presses the snap ring 251 against the annular piece 212A, thus preventing its rotation with respect to the internal half-plate 212B.

According to FIGS. 24 and 25, a stud 51 on the internal half-plate 12B carries, by virtue of a rivet 52, a radially extending support 53, as well as, on each side thereof, two elastic blades 54 and 57, both radial; the split segment 24 has one of its ends terminating in a radial return 55 gripped between the support 53 and the tongue 57, its other end 56 being in abutment on the external end of the elastic blade 54 at a circumferential distance from the support 53.

According to the arrangement as depicted, the internal half-plate 12B, subjected to angular accelerations in the anticlockwise direction, enables the external half-plate 12A to move in the clockwise direction, with respect to FIG. 25; however, in the case of strong acceleration, in this direction and by inertia due to its weight, the split segment 24 pushes the elastic blade 54 against the support 53. The elastic blade 54 expands and causes the split segment 24 to open, preventing the external half-plate 12A from turning.

According to FIG. 26, the annular piece 212A has ramps 218 adapted to cooperate with counter-ramps 317 carried by a cylindrical ring 351 with a circular transverse section centred on a step 325 on the internal half-plate 312B; the split elastic pin 322 passes through a lug 339 on the internal half-plate 312B and carries a rivet 323 fixing, to the pin 322, a radial abutment lug 337 with which the annular piece 212A is adapted to cooperate axially in abutment by virtue of a radial return 238 which it has.

The unidirectional means providing the non-return function is a split snap ring 350 fixed by one of its ends to the ring 351 which it surrounds.

The ring 351 is fixed to the internal half-plate 312B by friction controlled by a spring 352; thus, in the case of strong acceleration, the inertia of the assembly consisting of the ring 351, the split snap ring 350 and the annular piece 212A overcomes the friction due to the spring 352 and the assembly moves in rotation without there being able to be taking up.

FIGS. 27 and 28 show a clutch of the type in FIGS. 11 and 12 in which an elastic pin 422 radially passes through a lug 439 on the internal half-plate 412B and has a length such that it defines axially, in the engagement position of the clutch, between its free end not in abutment on the reaction plate and a lug 411, obtained by cropping and bending of the bottom of the cover 11, a play J1 corresponding to the lifting travel of the pressure plate 412 during this engagement.

The annular piece 412A has ramps 418 adapted to cooperate with counter-ramps 417 provided at the periphery of a ring 413 embedded in a groove in the internal half-plate 412B of the pressure plate 412; this annular piece 412A is adapted to cooperate with the lug 411 by virtue of a radial lug 438 which it has itself; in the engagement position of the clutch, this radial lug 438 is at an axial distance J2 from the lug 411 on the cover 11: naturally, the play J2 is equal to the play J1 plus the quantity of wear to be taken up axially, which tends towards zero during the taking-up operations.

The non-return function, or free wheel, is provided by a helical spring 440, with radial expansion, a radial return 441 of which is connected to the internal half-plate 412B.

It will be noted that this spring 440 does not support any axial load.

Figure 29:
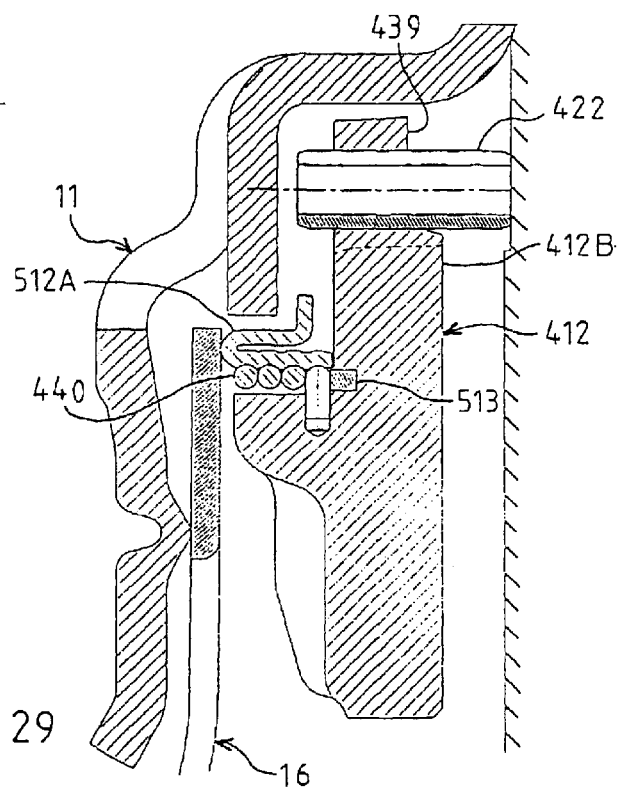

According to FIG. 29, the turns on the spring 440 are used as counter-ramps, the helical ramps being formed at the periphery of the annular piece 512A; here a ring 513, attached to the internal half-plate 412B, supports the first turn on the spring 440 whilst being shaped in a complementary manner.

Figure 30:
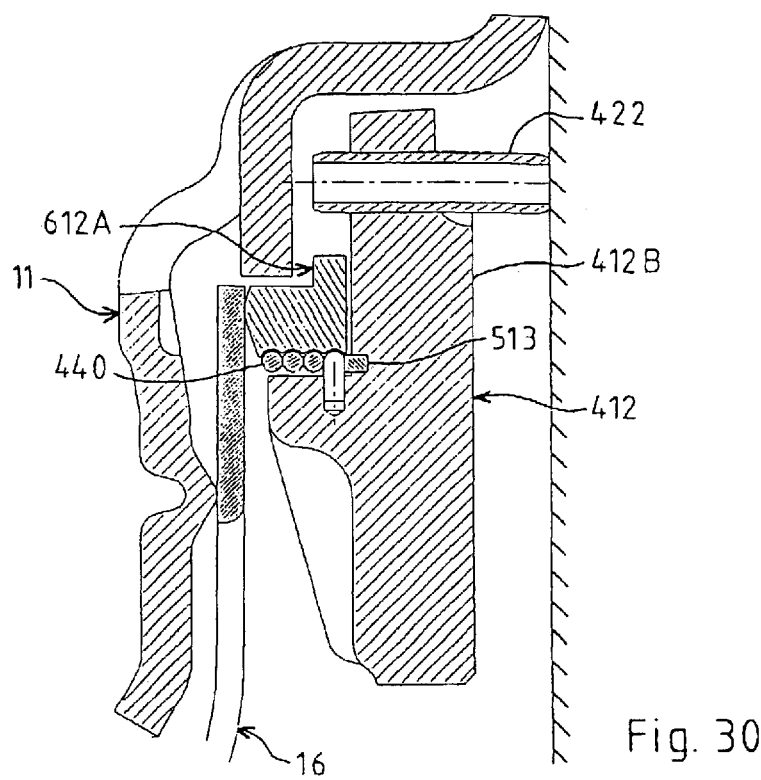

In FIGS. 27 to 29, the annular piece 412A or 512A is made from pressed sheet metal; according to FIG. 30, the annular piece 612A is similar to the annular piece 512A in FIG. 29, but here it is solid, its female thread being obtained for example by machining or with a die.

Figure 31:
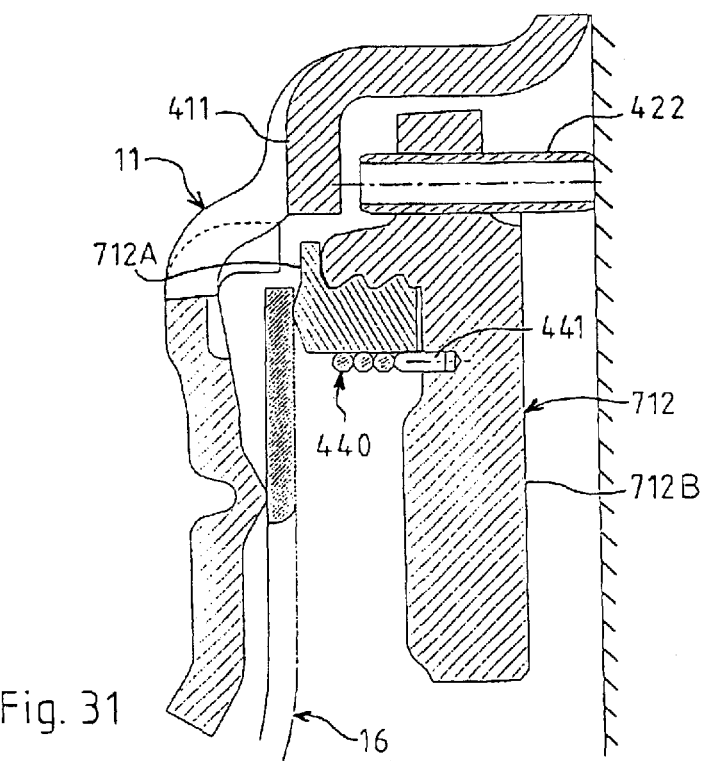

According to FIG. 31, the annular piece 712A is also solid and carries a thread at its external periphery cooperating with a thread provided at the internal periphery of an annular nose 714 on the internal half-plate 712B of the pressure plate 712; here the helical spring 440 expanded radially provides the non-return function, one of its ends being stopped with respect to the internal half-plate 712B by a return 441 which extends here axially.

Figure 32:
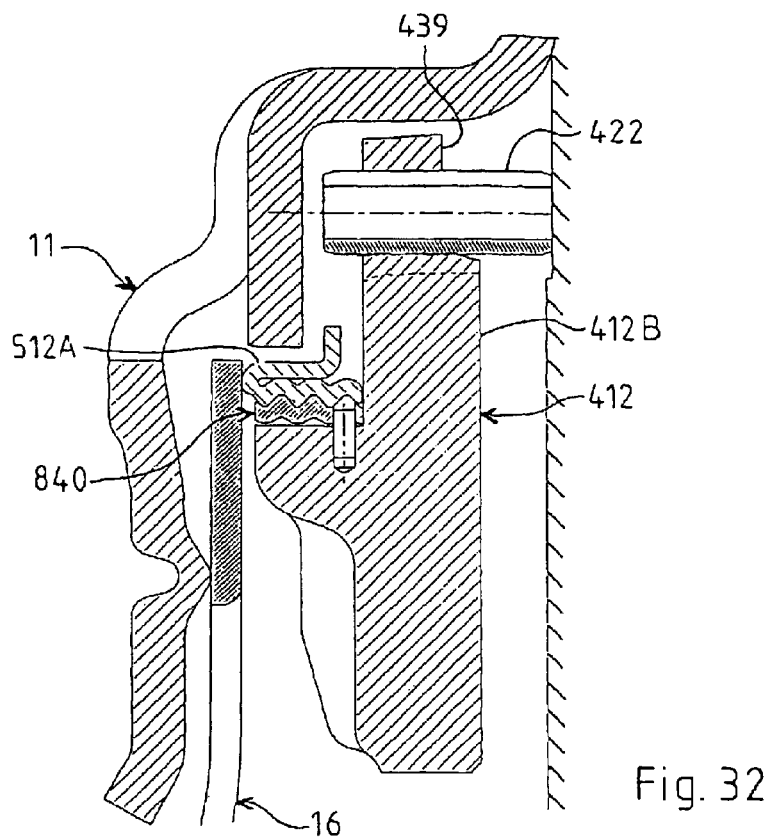

FIG. 32 is a variant of FIG. 29 in which the helical spring 440 has been replaced with a split ring made from rolled pressed sheet metal.

In FIGS. 33 and 34, it can be seen that the rod 1022 associated with an elastic washer 1024, in a lug 1039 on the pressure plate, is provided with a threaded tail 1023 which passes through the bottom of the cover to which it is fixed by means of a nut 1025.

The split snap ring 1026 is rotationally immobilised, with respect to the pressure plate, by virtue of the return 1028 on one of its ends and axially by virtue of a screw head 1027.

According to FIGS. 35 and 36, the ramps 218 on the annular piece 212A cooperate with counter-ramps 217 provided on the heads of studs 2217 attached to the internal half-plate 212B of the pressure plate 212; these heads are advantageously stepped so as to centre the annular piece 212A.

The use of such studs 2217 has the advantage of having available standard studs which can be used for various sizes, expressed by their diameter, of clutch; it suffices in fact to have available such studs according to the diameter corresponding to that of the annular piece 212A associated with the clutch.

The variant in FIGS. 37 and 38 is of the type described with regard to FIGS. 11, 15 or 16; here the radial lug 237 has a return 237A adapted to fit by elasticity in a housing 111, provided in the skirt of the cover 11, under the following conditions: at rest, that is to say in storage, the elastic pin 222 is retracted to the maximum extent in the half-plate 212B, towards the bottom of the cover 11, which half-plate 212B is distant from the said bottom, whilst the return 237A on the radial lug 237, offset axially with respect to the housing 111, is in abutment on the internal periphery of the skirt of the cover 11; after mounting on the vehicle, at the time of the first declutching, which brings the half-plate 212B closer to the bottom of the cover 11, the return 237A is snapped into the housing 111: detection is so to speak primed; the re-engagement which follows, the half-plate 212B moves with respect to the elastic pin 222 until the friction disc is clamped: the play take-up device can be used.

By virtue of the arrangement which has just been described, the clutch mechanism is compact during storage, the elastic pin 222 being able to be completely "retracted", towards the cover 11.

According to FIGS. 39 and 40, the split snap ring 850, which is adapted to cooperate with the internal periphery of the annular piece 812A, has its ends cut so as to define therein external arms 853, 854 and internal arms 851, 852; the internal arms 851 and the external arm 853 of one end have a Y-shaped configuration, as well as the internal arms 852 and the external arm 854 of the other end; between these ends there is disposed a lever 856 which extends radially; the external end of the lever 855 is in line with the external arms 853 and 854, whilst the central part of the lever 855 is in line with the internal branches 851, 852; the internal end of the lever 855 is placed in a notch 853 in the half-plate 812B, which is thus adapted to move this end in one direction or the other when it is subjected to an acceleration in one direction or the other, and thus generates locking in both directions; a draw spring 856 disposed between one and the other of the snap ring 850 allows the sliding of 812A during an acceleration of 812B in the clockwise direction below a certain acceleration value; consequently, beyond this acceleration value, by virtue of the lever 856, the snap ring 850 is once again expanded and rotationally fixes the annular piece 812A and the half-plate 812B.

According to the variant in FIGS. 41 and 42, it is the cover 911 which consists of two half-covers, one 911A referred to as the external half-cover, the other 911B referred to as the internal half-cover, the pressure plate 912 being in a single piece; here the internal half-cover 911B consists of the central part of the bottom of the cover 911 and carries the means 921 of articulation of the diaphragm 16 on the cover 911; the external half-cover 911A is threaded internally and the internal cover 911B is threaded externally so that the internal half-cover 911B is screwed into the external half-cover 911A.

One or more wedge-shaped brakes 950 are inserted locally between the two half-covers 911A, 911B in order to prevent a relative rotation movement of one with respect to the other; a tail 951 of the brake 950 passes through the diaphragm and the said tail 951 has, beyond the diaphragm 16, a head 952; thus the brake 950 is controlled by the diaphragm 16: the diaphragm 16 can move along the tail 951 of the wedge 950 but on one side, to the right in FIG. 41, it releases the wedge 950, when there is wear on the friction disc 14, and on the other side, to the left in FIG. 41, it introduces the brake 950 between the two half-covers 911A, 911B, during disengagement; thus it is the brake 950 which constitutes the end of travel stop for lifting of the plate 912.

Naturally, as in the previous variants, a free-wheel means is provided, not shown in the figures.

According to FIGS. 43 and 44, the snap ring 1050 is designed to be weighty so that it is under the effect of its inertia that it expands and locks the ring 1012A or contracts and releases the said ring 1012A; here a spring 1014 applies one of the ends of the snap ring 1050 to a radial lug 1013 of the external half-plate 1012B whilst bearing on it; for acceleration in the clockwise direction, as seen in FIG. 43, the snap ring 1050 locks the annular piece 1012A; for acceleration in the opposite direction, it releases the said annular piece 1012A; if this acceleration, in the said opposite direction, is indeed greater than the preloading of the spring 1014, the other end makes contact with the radial lug 1013 and, bearing on it, the snap ring 1050 expands whilst compressing the spring 1014 and locks the annular piece 1012A.

FIGS. 45 to 47 show a variant of the type described with regard to FIGS. 27 and 28, in which the non-return function, or free wheel, is provided by a snap ring 440, instead of a helical spring, and the ramps 418 on the annular piece 412A cooperate with counter-ramps 417 in the form of studs forming part of the internal half-plate 412B.

The counter-ramps 417 extend radially so that a so-called detection washer 462 can also cooperate with these by virtue of ramps 418A which it has at its periphery turned towards the internal half-plate 412B and which are similar to the ramps 418 on the annular piece 412A; an elastic washer 463, here corrugated, bears on the lug 411 of the cover 11, and holds in contact the ramps 418 and the counter-ramps 417.

A helical spring 464, aslant in FIG. 46, is disposed between the detection washer 462 and the annular piece 412A, which are thus coupled with, respect to rotation.

The load on the corrugated elastic washer 463 is chosen so as to be less than that on the elastic return means of the pressure plate 412, such as tangential tongues, so that, on disengagement, the corrugated elastic washer 463 is compressed and serves as an abutment for the internal half-plate 412B; in the engaged position, FIG. 45, the annular piece 412A is immobilised by the load on the diaphragm 16.

When the engine equipped with such a clutch is first started and after the first disengagement-engagement cycle, the annular piece 412A, by virtue of the vibration, positions itself; the helical spring 464 is primed.

When there is wear, the detection washer 462 moves when the force due to the helical spring 464 overcomes that due to the corrugated elastic washer 463; on disengagement, the wear is taken up by the annular piece 412A which turns and tensions the helical spring 464.

What is claimed is:

1. Friction clutch for a motor vehicle with a thermal engine, of the type comprising a reaction plate (13) intended to be rotationally fixed to a driving shaft, a friction disc (14), carrying friction linings (15) at its external periphery intended to be rotationally fixed to a driven shaft, a pressure plate (12, 112, 212, 312, 412, 712, 912), a cover (11, 911) fixed to the reaction plate (13), axially acting resilient means (16) acting between the cover (11, 911) and the pressure plate (12, 112, 212, 312, 412, 712, 812, 912), the pressure plate (12, 112, 212, 312, 412, 712, 812, 912) being rotationally fixed to the cover (11, 911) whilst being able to move axially with respect to it, an element in the form of one of the reaction plate (13), the pressure plate (12, 112, 212, 312, 412, 712, 812, 912) and the cover (11, 911) including two half-pieces able to be moved axially with respect to each other under the action of a device for taking up the play due to the wear of the friction linings, the play take-up device comprises at least one pair of circumferentially disposed complementary ramps (17, 117, 217, 317, 417; 18, 118, 218, 418) associated respectively with each of the two half-pieces (12A, 112A, 212A, 612A, 712A, 512A, 812A, 912A, 412A, 1012A; 12B, 112B, 212B, 312B, 412B, 712B, 812B, 912B, 1012B), one of the ramps (17, 117, 217, 317, 417) being adapted to move circumferentially with respect to the other ramp (18, 118, 218, 418) in the take-up direction to increase the overall thickness of the element and prevented from moving in the other direction by a unidirectional means (24, 133, 240, 251, 350, 352, 440, 840, 1026), the said circumferential movement being controlled by a release (22, 222, 322, 422, 922, 1022, 462) sensitive to the state of wear of the friction linings (15), one of the ramps (18, 118, 218, 418) being provided at the periphery of an inertia piece (12A, 112A, 212A, 612A, 712A, 512A, 812A, 912A, 412A, 1012A), so that a lack of periodicity of the thermal engine of the motor vehicle is taken advantage of in order to make the complementary ramps make their relative circumferential movement in the direction of taking up of the play, wherein the friction clutch further comprises control means sensitive to a centrifugal force and to an angular acceleration and adapted to selectively control the operation of the play take-up device.

2. Clutch according to claim 1, wherein the element is one of the reaction plate (13) and the pressure plate (12B, 112B, 212B, 312B, 412B, 712B, 812B, 912B, 1012B) including an external half-plate (12A, 112A, 212A, 612A, 712A, 512A, 812A, 912A, 412A, 1012A) and an internal half-plate (12B, 112B, 212B, 312B, 412B, 712B, 812B, 912B, 1012B), the internal half-plate (12B, 112B, 212B, 312B, 412B, 712B, 812B, 912B, 1012B) faces a friction lining and is intended to cooperate therewith, the two half-plates (12A, 112A, 212A, 612A, 712A, 512A, 812A, 912A, 1012A, 412A; 12B, 112B, 212B, 312B, 412B, 712B, 812B, 912B, 1012B) are rotationally fixed to the driving shaft and able to be moved axially one with respect to the other under the action of the play take-up device, one of the at least one pair of circumferentially disposed complementary ramps (17, 117, 217, 317, 417), referred to as the support ramp, is rotationally fixed to one (12B, 112B, 212B, 312B, 412B, 712B, 812B, 912B, 1012B) of the half-plates, the other ramp (18, 118, 218, 418), referred to as the adjustment ramp, is provided to move circumferentially with respect to the support ramp (17, 117, 217, 317, 417) in the direction of the increase in overall thickness of the element, and the adjustment ramp (18, 118, 218, 418) is provided at the periphery of the inertia piece (12A, 112A, 212A, 612A, 712A, 512A, 812A, 912A, 412A, 1012A).

3. Clutch according to claim 2, wherein the support ramp (17, 117, 217, 317, 417) is carried by the internal half-plate (12B, 112B, 212B, 312B, 412B, 712B, 812B, 912B, 1012B).

4. Clutch according to claim 3, in which the axially acting resilient means (16) consist of a diaphragm, wherein the external half-plate (12A, 112A, 212A, 612A, 712A, 512A, 812A, 912A, 412A, 1012A) is provided with a support bead (19, 119, 219) for the diaphragm.

5. Clutch according to claim 2, wherein the adjustment ramp (18, 118, 218, 418) is carried by the external half-plate (12A, 112A, 212A, 612A, 712A, 512A, 812A, 912A, 412A, 1012A).

6. Clutch according to claim 5, wherein the adjustment ramp (18) is carried by an internal periphery of the external half-plate (12A, 512A, 612A, 912A).

7. Clutch according to claim 6, wherein the adjustment (18) and support (17) ramps are helical threads having as their axis an axis of the clutch.

8. Clutch according to claim 5 wherein the adjustment ramp (18) is carried by an external periphery of the external half-plate (712A).

9. Clutch according to claim 2, wherein that the element is the pressure plate (12, 112, 212, 312, 412, 712, 912).

10. Clutch according to claim 2, wherein the adjustment ramp (118, 218) consists of a series of ramps extending circumferentially at the end of an annular piece (112A, 212A, 412A) made of cropped and bent sheet metal.

11. Clutch according to claim 2, wherein the unidirectional means is a split segment (24, 251, 352, 1026) rotationally fixed to the element at at least one point.

12. Clutch according to claim 11, wherein the control means comprise an elastic means (54) exerting a substantially tangential force and adapted to cooperate with the external half-plate (12A) under the action of the unidirectional means (24) moved by inertia.

13. Clutch according to claim 2, wherein the unidirectional means is a snap ring (240, 440) wound helically and rotationally fixed to the element at at least one point.

14. Clutch according to claim 2, wherein the control means comprise a lever (856) articulated on the internal half-plate (12B) and having one arm (856) adapted to cooperate with the unidirectional means (850).

15. Clutch according to claim 2, wherein the unidirectional means is a snap ring (251) and a weight (362) sensitive to centrifugal force and to an angular acceleration associated therewith in order to, beyond a certain speed of rotation or a certain angular acceleration, brake the external half-plate (212A).

16. Clutch according to claim 15, wherein the snap ring (351, 352) is subjected to the circumferential action of a spring (355).

17. Clutch according to claim 2, wherein the adjustment ramp (218) cooperate with the support ramp (317) carried by a ring (351) fixed to the internal half-plate (312B) by friction, which is elastically controlled (352).

18. Clutch according to claim 1, wherein the element is the cover (911).

19. Clutch according to claim 18, wherein the first half-piece in the form of an internal half-cover (911B) consists of a central part of a bottom of the cover (911) being threaded externally, whilst the second half-piece in the form of an external half-cover (911A) is threaded internally so that the internal (911B) and external (911A) half-covers are screwed one in the other.

20. Clutch according to claim 19, wherein a wedge-shaped brake (950) controlled by the diaphragm (16) can be inserted between the two half-covers (911A, 911B).

21. A friction clutch for a motor vehicle having a thermal engine, the friction clutch comprising a reaction plate (13) intended to be rotationally fixed to a driving shaft, a friction disc (14) carrying friction linings (15) at its external periphery and intended to be rotationally fixed to a driven shaft, a pressure plate (12, 112, 212, 312, 412, 712, 912), a cover (11, 911) fixed to the reaction plate (13), axially acting resilient means (16) acting between the cover (11, 911) and the pressure plate (12, 112, 212, 312, 412, 712, 812, 912), the pressure plate (12, 112, 212, 312, 412, 712, 812, 912) being rotationally fixed to the cover (11, 911) whilst being able to move axially with respect to it, one of the reaction plate (13), the pressure plate (12, 112, 212, 312, 412, 712, 812, 912) and the cover (11, 911) including two half-pieces able to be moved axially with respect to each other under the action of a device for taking up the play due to the wear, the play take-up device comprises at least one pair of circumferentially disposed complementary ramps (17, 117, 217, 317, 417; 18, 118, 218, 418) associated respectively with each of the two half-pieces (12A, 112A, 212A, 612A, 712A, 512A, 812A, 912A, 412A, 1012A; 12B, 112B, 212B, 312B, 412B, 712B, 812B, 912B, 1012B), one of the ramps (17, 117, 217, 317, 417) being adapted to move circumferentially with respect to the other ramp (18, 118, 218, 418) in a take-up direction to increase in the overall thickness of the one of the reaction plate (13), the pressure plate (12, 112, 212, 312, 412, 712, 812, 912) and the cover (11, 911) and prevented from moving in the opposite direction by a unidirectional means (24, 133, 240, 251, 350, 352, 440, 840, 1026), the circumferential movement being controlled by a release (22, 222, 322, 422, 922, 1022, 462) sensitive to the state of wear of the friction clutch, one of the ramps (18, 118, 218, 418) being provided at the periphery of an inertia piece (12A, 112A, 212A, 612A, 712A, 512A, 812A, 912A, 412A, 1012A) so that the complementary ramps make their relative circumferential movement in the direction of taking up of the play due to a non-cyclic nature of operation of the thermal engine, wherein the friction clutch comprises control means controlled by the axially acting resilient means (16) and provided to selectively control the operation of the play take-up device.

22. Clutch according to claim 21, wherein the control means comprise a brake (30) adapted to cooperate with one of the ramps (17, 18).

23. Clutch according to claim 22, wherein the brake is a tongue in the form of a pin mounted for articulation (32).

24. Clutch according to claim 22, wherein the brake is a tongue in the form of a curved sheet metal mounted by a pin for articulation (32).

* * * * *